United States Patent
Okuda et al.

(10) Patent No.: US 9,499,710 B2
(45) Date of Patent: Nov. 22, 2016

(54) RECORDING METHOD AND INK SET

(71) Applicant: Seiko Epson Corporation, Tokyo (JP)

(72) Inventors: Ippei Okuda, Shiojiri (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/592,355

(22) Filed: Jan. 8, 2015

(65) Prior Publication Data
US 2015/0197654 A1    Jul. 16, 2015

(30) Foreign Application Priority Data

Jan. 10, 2014  (JP) .................. 2014-002996
May 28, 2014  (JP) .................. 2014-109851

(51) Int. Cl.
| | | |
|---|---|---|
| *C09D 11/40* | (2014.01) | |
| *C09D 125/08* | (2006.01) | |
| *C08K 5/3417* | (2006.01) | |
| *C09D 11/54* | (2014.01) | |
| *B41M 5/00* | (2006.01) | |
| *C09D 11/322* | (2014.01) | |
| *C08K 5/098* | (2006.01) | |
| *C08K 5/092* | (2006.01) | |

(52) U.S. Cl.
CPC ............ *C09D 11/40* (2013.01); *B41M 5/0017* (2013.01); *C08K 5/3417* (2013.01); *C09D 11/322* (2013.01); *C09D 11/54* (2013.01); *C09D 125/08* (2013.01); *C08K 5/092* (2013.01); *C08K 5/098* (2013.01)

(58) Field of Classification Search
CPC ............... C09D 11/40; C09D 11/322; C09D 11/54; C09D 125/08; B41M 5/0017; C08K 5/3417; C08K 5/098; C08K 5/092
See application file for complete search history.

(56) References Cited

U.S. PATENT DOCUMENTS

| | | | |
|---|---|---|---|
| 2005/0270351 A1* | 12/2005 | Mouri | B41J 2/0057 347/103 |
| 2006/0203056 A1 | 9/2006 | Furukawa et al. | |
| 2007/0024684 A1* | 2/2007 | Konno | B41J 2/2114 347/95 |

(Continued)

FOREIGN PATENT DOCUMENTS

| | | |
|---|---|---|
| EP | 2090624 A1 | 8/2009 |
| JP | 2002-103783 A | 4/2002 |

OTHER PUBLICATIONS

Extended European Search Report issued May 11, 2015 from the European Patent Office (EPO) for EP15150211.9; (5 pages).

*Primary Examiner* — Justin Seo
*Assistant Examiner* — Roger W Pisha, II
(74) *Attorney, Agent, or Firm* — Harness, Dickey & Pierce, P.L.C.

(57) ABSTRACT

Disclosed herein is a recording method, including: sequentially attaching a first reaction liquid, a first ink containing a color material, a second reaction liquid, and a second ink containing a color material to a non-absorptive recording medium or a low-absorptive recording medium in a superimposed manner, wherein the first reaction liquid contains a coagulant for coagulating or thickening a component of the first ink, and wherein the second reaction liquid contains a coagulant for coagulating or thickening a component of the second ink.

11 Claims, 1 Drawing Sheet

(56) References Cited

U.S. PATENT DOCUMENTS

| | | | |
|---|---|---|---|
| 2008/0012894 A1* | 1/2008 | Ono | B41J 2/2114 347/21 |
| 2008/0311299 A1* | 12/2008 | Furukawa | B41J 3/44 427/261 |
| 2009/0258203 A1* | 10/2009 | Aoyama | B41J 2/17509 428/207 |
| 2010/0156973 A1* | 6/2010 | Suzuki | B41J 29/02 347/10 |
| 2013/0201252 A1 | 8/2013 | Namba | |

* cited by examiner

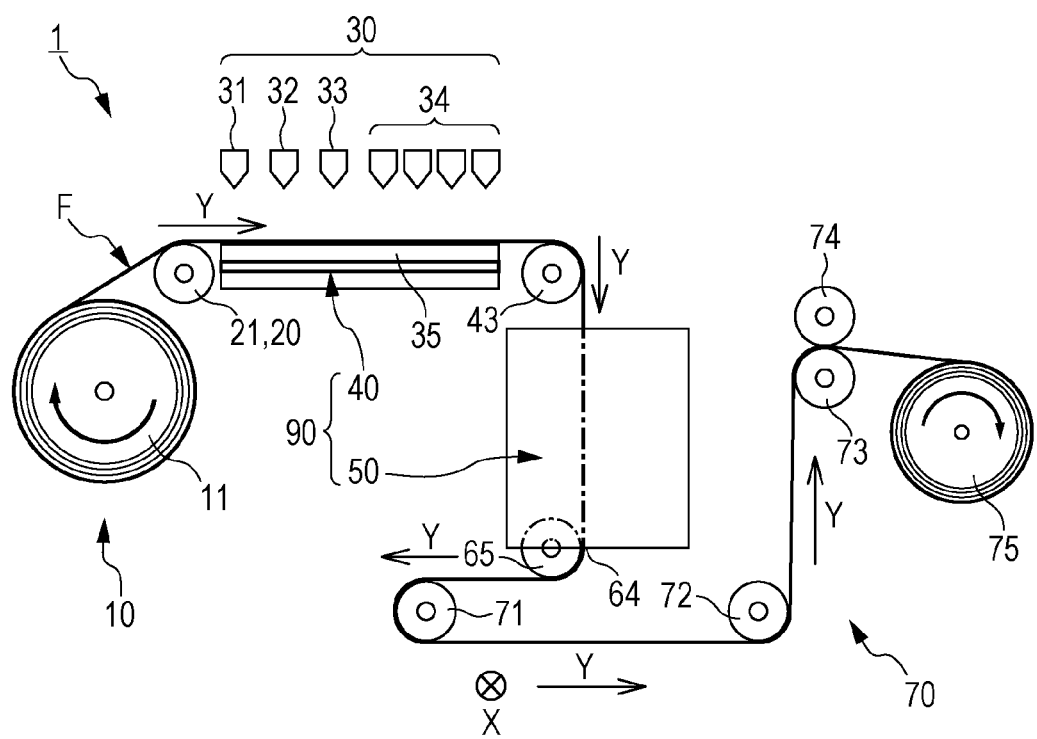

RECORDING METHOD AND INK SET

BACKGROUND

1. Technical Field

The present invention relates to a recording method and an ink set.

2. Related Art

Ink jet recording methods have been rapidly developed in many areas because high-definition images can be recorded by a comparatively simple device. For example, JP-A-2002-103783 discloses that recording is performed on an OHP sheet for ink jet printing using an ink containing titanium dioxide sol and a reaction liquid containing magnesium sulfate to form an image, for example, to realize formation of a white image having ink ejecting characteristics or high concealment when forming the white image through the ink jet recording method.

However, there is a problem in that bleeding of a colored ink occurs when a color image is recorded on the white image using the color ink if the recording is performed on a non-absorptive recording medium or a low-absorptive recording medium using the ink jet recording method disclosed in JP-A-2002-103783.

In order to suppress this bleeding, a method of heating the recording medium can be considered instead of a method of using the reaction liquid. However, there is also a problem in that high energy for heating is required, recording speed is low and clogging occurs in an ink jet nozzle, if the recording medium is heated without using the reaction liquid.

SUMMARY

An advantage of some aspects of the invention is to provide a recording method and an ink set used in this recording method, in which, when a plurality of inks are recorded on a non-absorptive recording medium or a low-absorptive recording medium in a superimposed manner, bleeding among these inks can be prevented, cohesion unevenness of ink can be suppressed, and clogging of an ink jet nozzle hardly occurs.

The present inventors have made efforts to solve the above-mentioned problems. As a result, the present inventors have completed an ink jet recording method, in which recording is performed on a non-absorptive recording medium or low-absorptive recording medium by using a predetermined reaction liquid and a predetermined ink in a predetermined order.

That is, the invention is as follows.

[1] According to an aspect of the invention, there is provided a recording method, including: sequentially attaching a first reaction liquid, a first ink containing a color material, a second reaction liquid, and a second ink containing a color material to a non-absorptive recording medium or a low-absorptive recording medium in a superimposed manner, wherein the first reaction liquid contains a coagulant for coagulating or thickening a component of the first ink, and wherein the second reaction liquid contains a coagulant for coagulating or thickening a component of the second ink.

[2] In the recording method according to the above [1], any one of the first ink and the second ink may be a color ink containing a color material or a black ink containing a black color material, and the other of the first ink and the second ink may be a white ink containing a white color material or a metallic ink containing a metallic color material.

[3] In the recording method according to the above [1] or [2], the first reaction liquid may contain at least one coagulant selected from the group consisting of a polyvalent metal salt and an organic acid.

[4] In the recording method according to any one of the above [1] to [3], the second reaction liquid may contain at least one coagulant selected from the group consisting of a polyvalent metal salt and an organic acid.

[5] In the recording method according to any one of the above [1] to [4], the second reaction liquid may further contain at least one selected from the group consisting of a component constituting a receiving layer of the second ink, and a cationic resin.

[6] In the recording method according to the above [5], the ratio of the attachment amount (unit: g) of the color material contained in the second ink per unit area of the attachment region on the recording medium to the attachment amount (unit: g) of at least one of the component constituting the receiving layer of the second ink, and the cationic resin, which are contained in the second reaction liquid, per unit area of an attachment region on the recording medium is 3 to 30.

[7] In the recording method according to any one of the above [1] to [6], the first ink may be a white ink containing a white color material or a metallic ink containing a metallic color material.

[8] In the recording method according to any one of the above [1] to [7], the ratio of the attachment amount (unit: g) of the color material contained in the first ink per unit area of the attachment region on the recording medium to the attachment amount (unit: mol) of the coagulant contained in the first reaction liquid per unit area of an attachment region on the recording medium is 900 to 35000.

[9] In the recording method according to any one of the above [1] to [8], the recording medium may be a non-absorptive recording medium.

[10] In the recording method according to any one of the above [1] to [9], the first reaction liquid may contain a surfactant, and may have a surface tension of less than or equal to 50 mN/m.

[11] In the recording method according to any one of the above [1] to [10], the ratio of the attachment amount (unit: mol) of the coagulant contained in the second reaction liquid per unit area of an attachment region on the recording medium to the attachment amount (unit: g) of the color material contained in the second ink per unit area of the attachment region on the recording medium may be 900 to 35000.

[12] According to another aspect of the invention, there is provided an ink set, including: the first ink containing a color material, which is used in the recording method according any one of the above [1] to [11]; the second ink containing a color material, which is used in the recording method according to any one of the above [1] to [11]; and at least one reaction liquid selected from the group consisting of the first reaction liquid containing a coagulant for coagulating or thickening a component of the first ink, which is used in the recording method according to any one of the above [1] to [11], and the second reaction liquid containing a coagulant for coagulating or thickening a component of the second ink, which is used in the recording method according to any one of the above [1] to [11].

BRIEF DESCRIPTION OF THE DRAWING

The invention will be described with reference to the accompanying drawing, wherein like numbers reference like elements.

FIGURE is a schematic side view showing an example of an ink jet recording apparatus that can be used in the present embodiment.

DESCRIPTION OF EXEMPLARY EMBODIMENTS

Hereinafter, an embodiment of the invention (hereinafter, referred to as "present embodiment") will be described in detail with reference to the drawings as necessary, but the invention is not limited thereto. Various modifications can be made within the scope not departing from the gist thereof. In the drawings, the same elements are given the same reference numerals and the description thereof will not be repeated. In addition, the positional relation such as top, bottom, left, and right is based on the positional relation shown in the drawings unless otherwise specified. Furthermore, the ratio of the dimensions is not limited to the ratio shown in the drawings.

Recording Method

The recording method according to the present embodiment includes: sequentially attaching a first reaction liquid, a first ink containing a color material, a second reaction liquid, and a second ink containing a color material to a non-absorptive recording medium or a low-absorptive recording medium (hereinafter, simply referred to as "recording medium") in a superimposed manner. Here, the first reaction liquid contains a coagulant for coagulating or thickening components of the first ink, and the second reaction liquid contains a coagulant for coagulating or thickening components of the second ink. Hereinafter, the first reaction liquid and the second reaction liquid are simply and collectively referred to as "reaction liquid". Further, the first ink and the second ink are simply and collectively referred to as "ink".

Specifically, the recording method according to the present embodiment includes the processes of: attaching a first reaction liquid onto a non-absorptive recording medium or a low-absorptive recording medium (first reaction liquid attaching process); attaching a first ink onto the first reaction liquid (first ink attaching process); attaching a second reaction liquid onto the first ink (second reaction liquid attaching process); and attaching a second ink onto the second reaction liquid (second ink attaching process). These processes are performed in this order. Hereinafter, respective processes and reaction liquids and inks used in the respective processes will be described.

FIGURE is a schematic side view showing an example of an ink jet recording apparatus 1 that can be used in the present embodiment. As shown in FIGURE, the ink jet recording apparatus 1 includes a recording medium feeding unit 10, a transporting unit 20, a recording unit 30, a drying device 90, and a discharging unit 70. The ink jet recording apparatus 1 may further include a pre-heater (not shown) to heat a recording medium F from the beginning.

Among these, the drying device 90 includes a first drying unit 40 for drying a recording medium and a second drying unit 50 for drying the recorded matter obtained by the recording method according to the present embodiment.

Further, the feeding unit 10 is provided such that the recording medium F can be sent to the transporting unit 20. Specifically, the feeding unit 10 has a roll medium holder 11, and the roll medium holder 11 holds the recording medium F. Further, the feeding unit 10 is configured such that the recording medium F can be sent to the transporting unit 20 located downstream in a feeding direction Y by rotating the recording medium F. The shape of the recording medium F is not limited to a roll shape.

Further, the transporting unit 20 is provided such that the recording medium F sent from the feeding unit 10 can be transported to the recording unit 30. Specifically, the transporting unit 20 has a first feeding roller 21, and is configured such that the sent recording medium F can be transported to the recording unit 30 located downstream in the feeding direction Y by the first feeding roller 21.

Further, the recording unit 30 is provided such that recording can be conducted by attaching a reaction liquid to the recording medium F sent from the transporting unit 20 and discharging an ink thereto. Specifically, the recording unit 30 includes a head 31 for performing the first reaction liquid attaching process, a head 32 for performing the first ink attaching process, a head 33 for performing the second reaction liquid attaching process, a head 34 for performing the second ink attaching process, and a platen 35 as a medium support. The attaching method of the reaction liquid and the ink is not limited to ink jet, and, particularly, the reaction liquid and the ink may be attached by roller coating, spray coating, or the like. Ink jet is preferable in terms of the reaction liquid and the ink being able to be attached with a high degree of accuracy in a predetermined amount at a predetermined position in the necessary area.

Among these, the platen 35 is provided to support the underside of the recording medium F. Further, the platen 35 is provided with the first drying unit 40 for drying the reaction liquid and the ink attached to the recording medium F. Further, the platen 35 is provided with a second feeding roller 43 located downstream in the feeding direction Y. The second feeding roller 43 is configured such that the recording medium F printed with recorded matter can be sent to the second drying unit 50 located downstream in the feeding direction Y.

Further, the second drying unit 50 is configured to further dry the reaction liquid and the ink attached to the recording medium F. Further, a third feeding roller 65 is provided near an outlet 64 of the second drying unit 50. The third feeding roller 65 is disposed to make contact with the underside of the recording medium F, and is configured such that the recording medium F can be sent to the discharging unit 70 located downstream in the feeding direction Y.

Moreover, the discharging unit 70 is provided such that the recording medium F sent from the second drying unit 50 is further sent downstream in the feeding direction Y, and is then discharged to the outside of the ink jet recording apparatus 1. Specifically, the discharging unit 70 includes a fourth feeding roller 71, a fifth feeding roller 72, a sixth feeding roller 73, a seventh feeding roller 74, and a winding roller 75. Among these rollers, the fourth feeding roller 71 and the fifth feeding roller 72 are disposed to make contact with the surface of the recording medium F. Further, the sixth feeding roller 73 and the seventh feeding roller 74 are disposed to form a pair of rollers. Further, the recording medium F discharged by the sixth feeding roller 73 and the seventh feeding roller 74 is wound by the winding roller 75.

First Reaction Liquid Attaching Process

The first reaction liquid attaching process is a process of attaching a reaction liquid onto a non-absorptive recording medium or a low-adsorptive recording medium before a first ink attaching process. The reaction liquid used in the first reaction liquid attaching process is a first reaction liquid. Attaching means is not particularly limited, but examples thereof may include roller coating, spray coating, and ink jet coating. Meanwhile, the recording method according to the present embodiment may further include a process of drying at least a part of the first reaction liquid applied onto the recording medium during the first reaction liquid attaching process or after the first reaction liquid attaching process.

The amount of the first reaction liquid attached to the recording medium per unit area of the attachment region thereof (hereinafter, in each embodiment, this amount is simply referred to as "attachment amount") is preferably 1 mg/inch$^2$ to 10 mg/inch$^2$, and more preferably 1 mg/inch$^2$ to 5 mg/inch$^2$. When the attachment amount of the first reaction liquid is within the above range, the obtained recorded matter tends to be more excellent in bleeding resistance.

The attachment amount of a coagulant contained in the first reaction liquid per unit area of the attachment region of the first reaction liquid on the recording medium is preferably $3\times10^{-5}$ mmol/inch$^2$ to $150\times10^{-5}$ mmol/inch$^2$. The lower limit thereof is more preferably equal to or more than $5\times10^{-5}$ mmol/inch$^2$, still more preferably equal to or more than $10\times10^{-5}$ mmol/inch$^2$, and particularly preferably equal to or more than $20\times10^{-5}$ mmol/inch$^2$. Further, the upper limit thereof is more preferably equal to or less than $100\times10^{-5}$ mmol/inch$^2$, still more preferably equal to or less than $80\times10^{-5}$ mmol/inch$^2$, further still more preferably equal to or less than $50\times10^{-5}$ mmol/inch$^2$, and particularly preferably equal to or less than $40\times10^{-5}$ mmol/inch$^2$. When the attachment amount thereof is within the above range, it is preferable in that the image quality or the like of the obtained recorded matter become more excellent, and in that the ratio of attachment amounts to be described later is easily adjusted.

First Ink Attaching Process

The first ink attaching process is a process of attaching a first ink to the first reaction liquid attached on the recording medium in a superimposed manner over at least a portion of the attachment region. Hereinafter, in each embodiment, at least a portion of the attachment region may be superimposed. In this case, since the first reaction liquid and the first ink are directly reacted, it is possible to coagulate the first ink rapidly. Moreover, the first reaction liquid may not be completely dried. When a process of drying the first reaction liquid is omitted, the attachment of the first ink can start early, and recording speed tends to increase. Meanwhile, the recording method according to the present embodiment may further include a process of drying at least a part of the first reaction liquid and the first ink applied onto the recording medium during the first ink attaching process or after the first ink attaching process.

The attachment amount of the first ink in the first ink attaching process is preferably 2 mg/inch$^2$ to 20 mg/inch$^2$, and more preferably 5 mg/inch$^2$ to 15 mg/inch$^2$. When the attachment amount of the first ink is within the above range, the obtained recorded matter tends to be more excellent in the bleeding resistance, clogging reliability, and stickiness.

The attachment amount of a color material contained in the first ink in the first ink attaching process is preferably 0.1 mg/inch$^2$ to 3 mg/inch$^2$. The lower limit thereof is more preferably equal to or more than 0.2 mg/inch$^2$, still more preferably equal to or more than 0.4 mg/inch$^2$, and further still more preferably equal to or more than 0.8 mg/inch$^2$. Further, the upper limit thereof is more preferably equal to or less than 2 mg/inch$^2$, still more preferably equal to or less than 1.8 mg/inch$^2$, and further still more preferably equal to or less than 1.6 mg/inch$^2$. When the attachment amount thereof is within the above range, it is preferable in that the image quality or the like of the obtained recorded matter become more excellent, and in that the ratio of attachment amounts to be described later be easily adjusted.

Second Reaction Liquid Attaching Process

The second reaction liquid attaching process is a process of attaching a reaction liquid onto the first ink attached onto the recording medium. The reaction liquid used in the second reaction liquid attaching process is a second reaction liquid. Attaching means is not particularly limited, but examples thereof may include roller coating, spray coating, and ink jet coating. Meanwhile, the recording method according to the present embodiment may further include a process of drying at least a part of the second reaction liquid applied onto the recording medium during the second reaction liquid attaching process or after the second reaction liquid attaching process.

The attachment amount of the second reaction liquid is preferably 1 mg/inch$^2$ to 10 mg/inch$^2$, and more preferably 1 mg/inch$^2$ to 5 mg/inch$^2$. When the attachment amount of the second reaction liquid is within the above range, the obtained recorded matter tends to be more excellent in bleeding resistance.

The attachment amount of a coagulant contained in the second reaction liquid per unit area of the attachment region of the second reaction liquid on the recording medium is preferably $1\times10^{-5}$ mmol/inch$^2$ to $100\times10^{-5}$ mmol/inch$^2$. The lower limit thereof is more preferably equal to or more than $3\times10^{-5}$ mmol/inch$^2$, and still more preferably equal to or more than $5\times10^{-5}$ mmol/inch$^2$. Further, the upper limit thereof is more preferably equal to or less than $70\times10^{-5}$ mmol/inch$^2$, still more preferably equal to or less than $50\times10^{5}$ mmol/inch$^2$, further still more preferably equal to or less than $30\times10^{-5}$ mmol/inch$^2$, and particularly preferably equal to or less than $20\times10^{-5}$ mmol/inch$^2$. When the attachment amount thereof is within the above range, it is preferable in that the image quality or the like of the obtained recorded matter become more excellent, and in that the ratio of attachment amounts to be described below be easily adjusted.

Second Ink Attaching Process

The second ink attaching process is a process of attaching a second ink onto the second reaction liquid attached on the recording medium. In this case, the first reaction liquid, the second reaction liquid, and the first ink may not be completely dried. When the second ink is attached onto the second reaction liquid in a state in which they are not completely dried, the second reaction liquid and the second ink can be easily reacted. Even though the first reaction liquid, the second reaction liquid, and the first ink are not completely dried, the second ink can be attached onto the second reaction liquid while suppressing the bleeding, thereby achieving high recording speed. Meanwhile, the recording method according to the present embodiment may further include a process of drying at least a part of the first reaction liquid, the second reaction liquid and the first ink, which are attached on the recording medium, before the second ink attaching process. It is preferable that this drying process be a process of drying a part of the first reaction liquid, the second reaction liquid, and the first ink, not a process of completely drying the first reaction liquid, the second reaction liquid, and the first ink. Further, the recording method according to the present embodiment may further include a process of drying at least a part of the second ink applied onto the recording medium during the second ink attaching process or after the second ink attaching process.

The attachment amount of the second ink in the second ink attaching process is preferably 2 mg/inch$^2$ to 20 mg/inch$^2$, and more preferably 5 mg/inch$^2$ to 15 mg/inch$^2$. When the attachment amount of the second ink is within the above range, the obtained recorded matter tends to be more excellent in the bleeding resistance, clogging reliability, and stickiness.

The attachment amount of a color material contained in the second ink in the second ink attaching process is preferably 0.1 mg/inch$^2$ to 3 mg/inch$^2$. The lower limit thereof is more preferably equal to or more than 0.2 mg/inch$^2$, and still more preferably equal to or more than 0.4 mg/inch$^2$. Further, the upper limit thereof is more preferably equal to or less than 2 mg/inch$^2$, still more preferably equal to or less than 1.7 mg/inch$^2$, further still more preferably equal to or less than 1.5 mg/inch$^2$, further still more preferably equal to or less than 1 mg/inch$^2$, and particularly preferably equal to or less than 0.7 mg/inch$^2$. When the attachment amount thereof is within the above range, it is preferable in that the image quality or the like of the obtained recorded matter become more excellent, and in that the ratio of attachment amounts to be described later be easily adjusted.

In the first ink attaching process and the second ink attaching process, it is possible to discharge the first ink or the second ink from nozzles of a line head or a serial head through an ink jet method to allow the first ink or the second ink to attach to the recording medium. In a line system using the line head, it is possible to record an image on the recording medium by fixing the head and moving the recording medium along a sub scanning direction (a longitudinal direction or a transporting direction of the recording medium) and by discharging ink droplets from the nozzle opening of the head in conjunction with this movement. In addition, in a serial system using the serial head, it is possible to record an image on the recording medium by moving the head along a main scanning direction (a horizontal direction or a width direction of the recording medium) and by discharging ink droplets from the nozzle opening of the head in conjunction with this movement.

In the second reaction liquid attaching process, at the time of attaching the second reaction liquid, the dryness factor of volatile components contained in the first reaction liquid and the first ink attached to a non-absorptive recording medium or a low-absorptive recording medium is preferably equal to or more than 50 mass %, more preferably equal to or more than 80 mass %, and still more preferably equal to or more than 90 mass %, based on the total amount of volatile components contained in the first reaction liquid before attachment and the first ink before attachment. When the dryness factor thereof is equal to or more than 50 mass %, there is a tendency for bleeding to be suppressed more efficiently. Meanwhile, in terms of recording speed, the dryness factor thereof is preferably less than or equal to 80 mass %, more preferably less than or equal to 50 mass %, and still more preferably less than or equal to 30 mass %. When the dryness factor thereof is less than or equal to 80 mass %, there is a tendency for recording speed to be more improved. Here, the "first reaction liquid before attachment" refers to a first reaction liquid before applying the first reaction liquid onto the recording medium in the first reaction liquid attaching process. Further, the "first ink before attachment" refers to a first ink before applying the first ink onto the recording medium in the first ink attaching process. The dryness factor of volatile components can be obtained through the methods described in Examples.

The ratio A of the attachment amount (unit: g) of a color material contained in the first ink per unit area of the attachment region on the recording medium to the attachment amount (unit: mol) of a coagulant contained in the first reaction liquid per unit area of an attachment region on the recording medium is preferably 900 to 35000. When the coagulant contained in the first reaction liquid contains a polyvalent metal salt, the ratio A is more preferably 1700 to 35000. Further, when the coagulant contained in the first reaction liquid contains an organic acid, the ratio A is more preferably 900 to 6000. When the ratio A is equal to or more than 900, it is possible to prevent precipitation of the coagulant of the first reaction liquid, cloudiness due to the first reaction liquid, stickiness, and the generation of a bad odor. Further, when the ratio A is less than or equal to 35000, it is possible to suppress the bleeding at the time of superimposing inks. Moreover, the ratio A can be controlled by the attachment amount of the first ink and the first reaction liquid.

The ratio B of the attachment amount (unit: g) of a color material contained in the second ink per unit area of the attachment region on the recording medium to the attachment amount (unit: mol) of a coagulant contained in the second reaction liquid per unit area of an attachment region on the recording medium is preferably 900 to 35000. When the coagulant contained in the second reaction liquid contains a polyvalent metal salt, the ratio B is more preferably 1000 to 35000. Further, when the coagulant contained in the second reaction liquid contains an organic acid, the ratio B is more preferably 900 to 6000. When the ratio B is equal to or more than 900, it is possible to prevent precipitation of the coagulant of the second reaction liquid, cloudiness due to the second reaction liquid, stickiness, and the generation of a bad odor. Further, when the ratio B is less than or equal to 35000, it is possible to suppress the bleeding at the time of superimposing inks. Moreover, the ratio B can be controlled by the attachment amount of the second ink and the second reaction liquid.

The ratio C of the attachment amount (unit: g) of a color material contained in the second ink to the attachment amount (unit: g) of a component constituting the receiving layer of the second ink, and the cationic resin, which are contained in the second reaction liquid, is preferably 3 to 30, more preferably 3 to 20, and still more preferably 3 to 12. When the ratio C is equal to or more than 3, the suppression of bleeding tends to be more excellent. When the ratio C is less than or equal to 30, there is a tendency for the attaching efficiency of the reaction liquid to be more excellent. Moreover, the ratio C can be controlled by the attachment amount of the second ink and the second reaction liquid.

Each of the ratios is the number of units of the latter with respect to one unit of the former to be compared, as clearly from the values given in Tables 1 to 4.

Further, when the ratio A is obtained from an attachment region where the amount of the color material attached to the recording medium in the above-mentioned first ink attaching process is the largest, and the ratio B and the ratio C are obtained from an attachment region where the amount of the color material attached to the recording medium in the above-mentioned second ink attaching process is the largest, it is preferable in terms of further improving the image quality and the like of recorded matter.

Further, when the attachment amount of the color material in the above-mentioned first ink attaching process is obtained within an attachment region where the amount of the color material attached to the recording medium in the first ink attaching process is the largest, and the attachment amount of the color material in the above-mentioned second ink attaching process is obtained within an attachment region where the amount of the color material attached to the recording medium in the second ink attaching process is the largest, it is preferable in terms of further improving the image quality and the like of recorded matter.

Further, when the attachment amount of the coagulant in the above-mentioned first ink attaching process is obtained within an attachment region where the amount of the color material attached to the recording medium in the first ink attaching process is the largest, and the attachment amount of the coagulant in the above-mentioned second ink attaching process is obtained within an attachment region where the amount of the color material attached to the recording medium in the second ink attaching process is the largest, it is preferable in terms of further improving the image quality and the like of recorded matter.

In the recording method according to the present embodiment, it is preferable that the surface temperature of the recording medium in at least one of the first reaction liquid attaching process, the second reaction liquid attaching process, the first ink attaching process, and the second ink attaching process be 10° C. to 65° C. In addition, the surface temperature thereof is more preferably lower than or equal to 50° C., and still more preferably lower than or equal to 40° C. in terms of obtaining more excellent clogging reliability. Meanwhile, the surface temperature thereof is more preferably higher than or equal to 20° C., still more preferably higher than or equal to 40° C., and particularly preferably higher than or equal to 50° C. in terms of achieving more excellent recording speed. When the surface temperature of the recording medium is within the above range, the clogging reliability and the recording speed tend to be more excellent.

First Reaction Liquid

The first reaction liquid contains a coagulant for coagulating or thickening a component of the first ink. When this reaction liquid is used, it is possible to obtain a recorded matter with good quality without heating the recording medium and to suppress clogging of a nozzle caused by the nozzle being dried or the like due to the heating of the recording medium. Specifically, when the first reaction liquid contains the coagulant, it is possible to coagulate a pigment contained in the first ink without heating, and it is possible to prevent cohesion unevenness of the first ink, thereby obtaining the recorded matter with good quality.

The surface tension of the first reaction liquid at 25° C. is preferably less than or equal to 50 mN/m, and more preferably less than or equal to 40 mN/m. When the surface tension thereof is within the above range, in the case where recording is conducted on the recording medium, it is possible to prevent the first reaction liquid from flowing on the recording medium, and to prevent the coagulant of the first reaction liquid from being unevenly attached to the recording medium. Thus, there is a tendency to suppress the cohesion unevenness of the first ink. Further, in the case of a low-absorptive recording medium and a non-absorptive recording medium, when the coagulant is thickly applied, the coagulant tends to easily precipitate, but when the surface tension thereof is within the above range, the precipitation of the coagulant can be suppressed even when recording is performed on the low-absorptive recording medium or the non-absorptive recording medium. Further, the lower limit of the surface tension of the first reaction liquid is not particularly limited, but is preferably equal to or more than 1 mN/m at 25° C. Moreover, the surface tension thereof can be measured by the methods described in Examples.

Second Reaction Liquid

The second reaction liquid contains a coagulant for coagulating or thickening a component of the second ink. When this reaction liquid is used, it is possible to obtain a recorded matter with good quality without heating the recording medium and to suppress clogging of a nozzle caused by the nozzle being dried or the like due to the heating of the recording medium. Specifically, when the second reaction liquid contains the coagulant, it is possible to coagulate a pigment contained in the second ink without heating, and it is possible to prevent the bleeding of the second ink, thereby obtaining the recorded matter with good quality.

The surface tension of the second reaction liquid at 25° C. is preferably less than or equal to 50 mN/m, and more preferably less than or equal to 40 mN/m. When the surface tension thereof is within the above range, it is possible to uniformly apply the second reaction liquid at the time of performing recording on the recording medium. Further, the lower limit of the surface tension of the second reaction liquid is not particularly limited, but is preferably equal to or more than 1 mN/m at 25° C. Moreover, the surface tension thereof can be measured by the methods described in Examples. The composition of the second reaction liquid may be the same as or different from that of the first reaction liquid, particularly when it adheres to nothing.

Coagulant

The coagulant that can be contained in the first reaction liquid and the second reaction liquid is not particularly limited, but, for example, it is preferable that the coagulant contain at least one selected from the group consisting of a polyvalent metal salt and an organic acid.

Polyvalent Metal Salt

The polyvalent metal salt is not particularly limited, but for example, a polyvalent metal salt of an inorganic acid or a polyvalent metal salt of an organic acid is preferable. Such a polyvalent metal salt is not particularly limited, but examples thereof include a salt of alkaline earth metal (for example, magnesium and calcium) of a group 2 in the periodic table; a salt of transition metal (for example, lanthanum) of a group 3 in the periodic table; a salt of earth metal of a group 13 in the periodic table (for example, aluminum); and a salt of lanthanides (for example, neodymium). Organic acid or inorganic acid for forming a polyvalent metal and a salt thereof are not particularly limited, but preferable examples thereof include carboxylate (formate, acetate, benzoate, or the like), sulfate, nitrate, chloride, and thiocyanate. Among these, a calcium salt or a magnesium salt of carboxylic acid (formic acid, acetic acid, benzoic acid, or the like); a calcium salt or a magnesium salt of sulfuric acid; a calcium salt or a magnesium salt of nitric acid; calcium chloride; magnesium chloride; and a calcium salt or a magnesium salt of thiocyanic acid are preferable. The polyvalent metal and the organic acid or inorganic acid constituting the polyvalent metal salt may be a combination of the above and may be a hydrate. The polyvalent metal salt may be used alone or in a combination of two or more thereof.

The content of the polyvalent metal salt is preferably 0.1 mass % to 5.0 mass %, and more preferably 0.1 mass % to 4.0 mass %, based on the total amount of the reaction liquid. When the content of the polyvalent metal salt is within the above range, the obtained recorded matter tends to be more excellent in the bleeding resistance.

Organic Acid

The organic acid is not particularly limited, but examples thereof include phosphoric acid, oxalic acid, malonic acid, succinic acid, citric acid, and acetic acid. Among these organic acids, at least a monovalent carboxylic acid is preferable. With the inclusion of such carboxylic acid, the obtained recorded matter tends to be more excellent in the bleeding resistance. The organic acid may be used alone or in a combination of two or more thereof. In addition, the organic acid may be in a state of a salt. The organic acid salt is not particularly limited, but an example thereof includes the above-described salts of organic acids (where it is not overlapped to the above-described polyvalent metal salt). The above-described salts of the organic acids are not particularly limited, but an example thereof includes sodium acetate. The organic acid salt may be used alone or in a combination of two or more thereof.

The content of the organic acid is preferably 1 mass % to 15 mass %, and more preferably 1 mass % to 10 mass %, based on the total of the reaction liquid. When the content of the organic acid is within the above-described range, the obtained recorded matter tends to be more excellent in the bleeding resistance.

It is preferable that each of the first reaction liquid and the second reaction liquid further contain a component constituting a receiving layer of the second ink, or a cationic resin. Particularly, it is preferred that the second reaction liquid further contain any one of a component constituting a receiving layer of the second ink, and a cationic resin.

Component Constituting Receiving Layer of Second Ink

When the reaction liquid contains the component constituting the receiving layer, the obtained recorded matter tends to be more excellent in the bleeding resistance and color developing property. The component constituting the receiving layer is not particularly limited, but examples thereof include an inorganic fine particle and a solid resin fine particle in liquid. Examples of such particles include a cationic particle, a nonionic particle, and an anionic particle.

When a cationic particle is used, it is possible to form a layer receiving the first ink or the second ink and to coagulate the ink component. The cationic particle is not limited, but an example thereof includes SNOWTEX ST-AK (trade name, manufactured by NISSAN CHEMICAL INDUSTRIES, LTD.).

When an anionic particle or a nonionic particle is used, it is possible to form a layer receiving the first ink or the second ink. The anionic particle or the nonionic particle is not particularly limited, but an example thereof includes anionic colloidal silica. An example of the commercially available anionic colloidal silica includes SNOWTEX ZL (trade name, manufactured by NISSAN CHEMICAL INDUSTRIES, LTD.). Among these, particles, where a gap remains between fine particles in a state in which the particles adhere to a recording medium to form a coating film, are preferable. The "gap" refers to a space in a state where the coating film of the reaction liquid is dried. When the reaction liquid is applied to the recording medium and the coating film is formed, it is possible to make a gap between the fine particles in the coating film using the component constituting the receiving layer and at least an ink attached after the reaction liquid is absorbed in the gap. Therefore, the bleeding is further suppressed, which is more preferable.

The content of the component constituting the receiving layer is preferably 0.1 mass % to 10 mass %, and more preferably 0.1 mass % to 7 mass %, based on the total amount of the reaction liquid. When the content of the component constituting the receiving layer is within the above range, the obtained recorded matter tends to be more excellent in the bleeding resistance and color developing property. The component constituting the receiving layer may be used alone or in a combination of two or more thereof.

Cationic Resin

When the reaction liquid contains a cationic resin, the obtained recorded matter tends to be more excellent in the bleeding resistance and the color developing property. The cationic resin is not particularly limited, but examples thereof include a water-soluble cationic resin which is soluble in the reaction liquid and a cationic resin emulsion which exists in a dispersion state in liquid such as a resin emulsion. Among these resins, the cationic resin which is soluble in the reaction liquid is preferable in terms of the reaction of the ink component and the cationic resin being excellent. The interaction between the cationic resin and the pigment contained in the first ink or the second ink is comparatively weak compared to the interaction between the above-mentioned coagulant and this cationic resin, and thus, the cationic resin acts as an auxiliary agent of the coagulant rather than acting as the coagulant.

The cationic resin which is soluble in the reaction liquid is not particularly limited, but an example thereof includes an amine-based resin, and examples of the amine-based resin include polyallylamine and polyallylamine derivatives. An example of the commercially available product of the resin which is soluble in the reaction includes UNISENCE KHE105L (manufactured by SENKA Corporation).

The cationic resin emulsion is not particularly limited, but examples thereof include a polyolefin-based resin, a urethane-based resin, an acrylic-based resin, and a polyester-based resin. More specifically, another example thereof includes resin emulsion that can be contained in the ink to be described later. An example of commercially available cationic resin emulsion includes Arrow base CD-1200 (trade name, manufactured by UNITIKA, LTD., polyolefin-based resin).

The content of the cationic resin is preferably 0.1 mass % to 10 mass %, and more preferably 3 mass % to 10 mass %, based on the total amount of the reaction liquid. When the content of the cationic resin is within the above range, the obtained recorded matter tends to be more excellent in the bleeding resistance and the color developing property. The cationic resin may be used alone or in a combination of two or more thereof.

Other Components

The reaction liquid may further contain a solvent, a surfactant, or the like in addition to the above-mentioned components. Hereinafter, other components that can be contained in the first reaction liquid and the second reaction liquid will be described.

Solvent

It is preferable that the reaction liquid in the present embodiment further include a solvent. The solvent is not particularly limited, and for example, an organic solvent or water can be used as the solvent.

Examples of water include water from which as many ionic impurities as possible are removed, for example, pure water or ultrapure water such as ion-exchanged water, ultra-filtered water, reverse osmosis water, and distilled water. In addition, when water sterilized by the irradiation with ultraviolet light, the addition of hydrogen peroxide, or the like is used, it is possible to prevent the generation of mold or bacteria during long-term preservation of the reaction liquid. Accordingly, the storage stability of the reaction liquid tends to be further improved.

The content of the water is preferably 60 parts by mass to 98 parts by mass, and more preferably 65 parts by mass to 97 parts by mass, based on 100 parts by mass of the reaction liquid. When the content of the water is within the above range, the viscosity of the reaction liquid tends to be lower.

The organic solvent is not particularly limited, but specific examples thereof include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; and 1,1,3,3-tetramethyl urea. Among these, it is preferable to use one or more selected from the group consisting of 1,2-hexanediol, triethylene glycol monobutyl ether, and dipropylene glycol mono-propyl ether. Further, a volatile water-soluble organic solvent is more preferable as the organic solvent.

The organic solvent may be used alone or in a combination of two or more thereof. The content of the organic solvent is preferably 1 mass % to 25 mass % based on the total amount of the reaction liquid.

Surfactant

It is preferable that the reaction liquid used in the present embodiment contain a surfactant. The surfactant is not particularly limited, but preferable examples thereof include at least one selected from the group consisting of an acetylene glycol-based surfactant, a fluorine-based surfactant, and a silicone-based surfactant.

Among these, the silicone-based surfactant is more preferable because its solubility in the reaction liquid becomes high and foreign materials are hardly generated in the reaction liquid.

The acetylene glycol-based surfactant is not particularly limited, but preferable examples thereof include one or more selected from 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol and an alkylene oxide adduct of 2,4-dimethyl-5-decyne-4-ol. The commercially available products of the fluorine-based surfactant are not particularly limited, but examples thereof include an Olfine 104 series or an E series such as Olfine E1010 (trade name, manufactured by Air Products Japan, Inc.), and Surfynol 465 or Surfynol 61 (trade name, manufactured by Nissin Chemical Industry Co., Ltd.). The acetylene glycol-based surfactant may be used alone or in a combination of two or more thereof.

The fluorine-based surfactant is not particularly limited, but examples thereof include perfluoroalkyl sulfonate, perfluoroalkyl carboxylate, perfluoroalkyl phosphate, a perfluoroalkyl ethylene oxide adduct, perfloroalkyl betaine, and a perfluoroalkyl amine oxide compound. The commercially available products of the fluorine-based surfactant are not particularly limited, but examples thereof include S-144 and S-145 (manufactured by Asahi Glass Co., Ltd.); FC-170C, FC-430, and Fluorad-FC4430 (manufactured by Sumitomo 3M, Ltd.); FSO, FSO-100, FSN, FSN-100, and FS-300 (manufactured by Dupont Co.); and FT-250 and FT-251 (Neos Co., Ltd.). The fluorine-based surfactant may be used alone or in a combination of two or more thereof.

Examples of the silicone-based surfactant include a polysiloxane-based compound, polyether-modified organosiloxane, and the like. The commercially available product of the silicone-based surfactant is not particularly limited, but specific examples thereof include BYK-306, BYK-307, BYK-333, BYK-341, BYK-345, BYK-346, BYK-347, BYK-348, and BYK-349 (trade name, manufactured by BYK Japan K.K.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all are trade name, manufactured by Shin-Etsu Chemical Co., Ltd.).

The content of the above-described surfactant is preferably 0.1 mass % to 5 mass %, and more preferably 0.1 mass % to 3 mass %, based on the total mass (100 mass %) of the reaction liquid. When the content of the surfactant is within the above range, the wettability of the reaction liquid attached to the recording medium tends to be further improved.

First Ink

The first ink contains a color material. The content of the color material in the first ink is preferably 2 mass % to 20 mass %, and more preferably 5 mass % to 20 mass % based on the total amount of the first ink. When the content of the color material is within the above range, the obtained recorded matter tends to be more excellent in the bleeding resistance and the color developing property.

The surface tension of the first ink is preferably less than or equal to 50 mN/m, and more preferably less than or equal to 40 mN/m at a temperature of 25° C. When the surface tension thereof is within the above range, it is possible to uniformly apply the first ink while performing the recording on the recording medium. In addition, the lower limit of the surface tension of the first ink is not particularly limited, but it is preferable that the lower limit thereof be more than or equal to 1 mN/m at the temperature of 25° C. In this case, the surface tension thereof can be measured by the method described in Examples.

Second Ink

The second ink contains a color material. The content of the color material in the second ink is preferably 2 mass % to 15 mass %, and more preferably 3 mass % to 13 mass % based on the total amount of the second ink. When the content of the color material is within the above range, the obtained recorded matter tends to be more excellent in the bleeding resistance and the color developing property.

The surface tension of the second ink is preferably less than or equal to 50 mN/m, and more preferably less than or equal to 40 mN/m at a temperature of 25° C. When the surface tension thereof is within the above range, it is possible to uniformly apply the second ink while performing the recording on the recording medium. In addition, the lower limit of the surface tension of the second ink is not particularly limited, but it is preferable that the lower limit thereof be more than or equal to 1 mN/m at the temperature of 25° C. In this case, the surface tension thereof can be measured by the method described in Examples.

Color Material

The color material that can be contained in the first ink and the second ink will be described hereinafter. The first ink and the second ink may respectively contain a single color material or two or more of color materials. In addition, Examples of the color material include a dye and a pigment, but, among these, a pigment is preferable.

An example of a black color material used in a black ink includes carbon black. The carbon black is not particularly limited, but examples thereof include No. 2300, No. 900, MCF88, No. 33, No. 40, No. 45, No. 52, MA7, MA8, MA100, No. 2200B, or the like (all are manufactured by Mitsubishi Chemical Corporation); Raven 5750, Raven 5250, Raven 5000, Raven 3500, Raven 1255, Raven 700, or the like (all are manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, or the like (all are manufactured by Degussa).

Color materials used in a white ink are not particularly limited, but examples thereof include C.I. Pigment Whites 6, 18, and 21. Other examples of pigments used in the white ink include alkaline earth metal sulfates such as barium sulfates; alkaline earth metal carbonates such as calcium carbonates; silica such as finely-powdered silicate or synthetic silicate; metal compounds such as calcium silicate, alumina, hydrated alumina, titanium dioxide, and zinc oxide; talc; and clay.

Yellow color materials used in an yellow ink, which is a color ink, are not particularly limited, but examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Magenta color materials used in a magenta ink, which is a color ink, are not particularly limited, but examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

Cyan color materials used in a cyan ink, which is a color ink, are not particularly limited, but examples thereof include C.I. Pigment Blues 1, 2, 3, 15, 15:1, 15:2, 15:3, 15:34, 15:4, 16, 18, 22, 25, 60, 65, and 66, and C.I. Vat Blues 4 and 60.

Other color materials except for magenta, cyan, and yellow color materials are not particularly limited, but examples thereof include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

An example of a metallic color material used in a metallic ink includes a metallic pigment. Metal micro-particles can be used in the metallic ink and examples of the metal include aluminum, aluminum alloy, and silver. The metallic ink is an ink in which a pattern applied and formed on the recording medium has metallic luster, and the metallic pigment is a pigment that expresses the metallic luster.

It is preferable that the first ink be a white ink containing a white color material or a metallic ink containing a metallic color material. When such an ink is used, it is possible to obtain a recorded matter having excellent color developing and photoluminescent properties with respect to a non-absorptive or low-absorptive recording medium except for white color when performing the recording on the non-absorptive recording medium or the low-absorptive recording medium. The non-absorptive or low-absorptive recording medium except for white color is not particularly limited, but examples thereof include a transparent medium, a color medium, a metallic medium, and the like.

Further, it is preferable that the first ink be a white ink containing a white color material or a metallic ink containing a metallic color material and the second ink be a color ink containing a color material or a black ink containing a black color material. When such an ink is used, it is possible to obtain a recorded matter having excellent color developing and photoluminescent properties with respect to a non-absorptive or low-absorptive recording medium except for white color when performing the recording on the non-absorptive or low-absorptive recording medium. The non-absorptive or low-absorptive recording medium except for white color is not particularly limited, but examples thereof include a transparent medium, a color medium, a metallic medium, and the like.

Further, it is preferable that the first ink be a color ink containing a color material or a black ink containing a black color material and the second ink be a white ink containing a white color material or a metallic ink containing a metallic color material. When such an ink is used, it is possible to obtain a recorded matter on which an image of a white or metal-colored picture or character is recorded on a colored or black background image or to obtain a recorded matter which is recorded on a transparent recording medium and used to be recognized from the underside of the recording medium.

When a pigment is used as the above color material, it is preferable that the pigment be added to the ink as a pigment dispersing liquid which is obtained by dispersing the pigment in water using a dispersant, or as a pigment dispersing liquid which is obtained by dispersing a self-dispersion type surface-treated pigment, in which a hydrophilic group is introduced to the surface of the pigment particle using a chemical reaction, in water, or obtained by dispersing a pigment covered with a polymer in water.

The above-described dispersant is not particularly limited, but examples thereof may include polymer dispersants (proteins such as glue, gelatin, casein, and albumin; natural gums such as gum arabic and gum tragacanth; glucosides such as saponin; alginic acid ferments such as alginic acid, propylene glycol ester, triethanolamine alginate, and ammonium alginate; cellulose derivatives such as methyl cellulose, carboxymethyl cellulose, and ethyl hydroxy cellulose; polyvinyl alcohols; polypyrrolidones; acrylic-based resins such as polyacrylic acid, acrylic acid-acrylonitrile copolymers, potassium acrylate-acrylonitrile copolymers, vinyl acetate-acrylic acid ester copolymers, and acrylic acid-acrylic acid ester copolymers; styrene-acrylic resins such as styrene-acrylic acid copolymers, styrene-methacrylic acid copolymers, styrene-methacrylic acid-acrylic acid ester copolymers, and styrene-m-methyl-styrene-acrylic acid copolymers; vinyl acetate-based copolymers such as styrene-maleic acid copolymers, styrene-maleic anhydride copolymers, vinyl naphthalene-acrylic acid copolymers, vinyl acetate-ethylene copolymers, vinyl acetate-fatty acid vinyl ethylene copolymers, vinyl acetate-maleic acid ester copolymers, vinyl acetate-croton copolymers, vinyl acetate-acrylic acid copolymers, and salts thereof), and surfactants (various anionic surfactants, nonionic surfactants, amphoteric surfactants).

The above-described self-dispersion type surface-treated pigment to which the hydrophilic group is introduced is a pigment that can be dispersed or dissolved in the water without using the dispersant through the surface treatment in which a carboxyl group or a salt thereof is directly connected to the surface of the pigment. Specifically, the self-dispersion type surface-treated pigment can be obtained by grafting a functional group or a molecule containing the functional group on the surface of the pigment through physical treatment such as vacuum plasma or chemical treatment using an oxidizing agent such as sodium hypochlorite or ozone. The functional group grafted on a pigment particle may be a single kind or multiple kinds. The type and degree of the grafted functional group may be appropriately set while considering dispersion stability in the ink, color density, and drying properties in a front face of an ink jet head.

In addition, the above-described pigment covered with the polymer is not particularly limited, but for example, after dispersing the pigment using the dispersant having a polymerizable group, it is possible to obtain the covered pigment by performing emulsion polymerization in the water using a monomer (copolymerizable monomer) which is copolymerizable with the dispersant and a photoradical polymerization initiator. Among the polymers, a monomer which has at least one selected from the group consisting of acryloyl group, methacryloyl group, a vinyl group, and an allyl group as double bonds, or an oligomer which is polymerized according to a well-known polymerization method using a photoradical polymerization initiator can be suitably used. For the emulsion polymerization, a general method can be used and the polymerization is progressed using a free radical generated by thermal decomposition of a water-soluble photoradical polymerization initiator in the presence of an emulsifier.

The pigment and dispersant constituting the above-described pigment dispersing liquid may be respectively used alone or in a combination of two or more thereof.

Resin Emulsion

In a case where the ink used in the present embodiment contains a pigment as a color material, it is preferable to further contain a resin emulsion. With the use of the resin emulsion, resins themselves and a resin and a pigment in the resin emulsion are mutually fused in accordance with drying of the ink to fix the pigment to the recording medium. Therefore, it is possible to enhance friction resistance and adhesiveness of the image portion of the recorded matter. Among the resin emulsions, a urethane resin emulsion and acrylic resin emulsion are preferable, and the urethane resin emulsion is more preferable. Accordingly, the ink becomes excellent in fixing properties, thereby becoming excellent in the friction resistance and the adhesiveness of the recorded matter as well.

In addition, an anionic resin emulsion is also preferable. A resin containing the anionic resin emulsion is not particularly limited, but examples thereof include a homopolymer or a copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride; fluororesins; and natural resins. Among these, at least one selected from the group consisting of a (meth)acrylic-based resin and a styrene-(meth)acrylic acid copolymer-based resin is preferable, at least one selected from the group consisting of an acrylic-based resin and a styrene-acrylic acid copolymer-based resin is more preferable, and the styrene-acrylic acid copolymer-based resin is still more preferable. The above-described copolymer may be in any form of a random copolymer, a block copolymer, an alternating copolymer, and a graft copolymer.

A resin emulsion obtained using a well-known material and a well-known production method may be used, and a commercially available resin emulsion may also be used as the resin emulsion. The commercially available resin emulsion is not particularly limited, but examples thereof include Mowinyl 966A (trade name of an acrylic resin emulsion, manufactured by Nippon Synthetic Chemical Industry Co., Ltd.); Microgel E-1002 and Microgel E-5002 (all are trade names, manufactured by Nippon Paint Co., Ltd.); Voncoat 4001 and Voncoat 5454 (all are trade names, manufactured by DIC Corporation); SAE 1014 (trade name, manufactured by Zeon Corporation); Saivinol SK-200 (trade name, manufactured by Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (all are trade names, manufactured by BASF Japan Ltd.); and NK binder R-5HN (trade name of an acrylic resin emulsion, 44% of solid content, manufactured by Shin-Nakamura Chemical Co., Ltd.). Among these, Mowinyl 966A which is the acrylic resin emulsion is preferable as it sufficiently satisfies the preferable physical property of the resin emulsion described above.

The resin emulsion may be used alone or in a combination of two or more thereof.

The content of a resin of the resin emulsion is preferably 3 mass % to 15 mass %, more preferably 7 mass % to 14 mass %, and still more preferably 8 mass % to 13 mass %, based on the total amount of each ink. When the content thereof is within the above range, the recorded matter tends to be more excellent in the adhesiveness and the friction resistance, and the ink tends to be excellent in long-term storage stability, and thereby the ink can be particularly made to have low viscosity.

Solvent

It is preferable that the ink in the present embodiment further contain a solvent. The solvent is not particularly limited, and for example, an organic solvent or water can be used as the solvent.

Examples of water include water from which ionic impurities are removed as much as possible, for example, pure water or ultrapure water such as ion-exchanged water, ultra-filtered water, reverse osmosis water, and distilled water. In addition, when water sterilized by the irradiation with ultraviolet light, the addition of hydrogen peroxide, or the like is used, it is possible to prevent the generation of mold or bacteria during long-term storage of the ink. Accordingly, the storage stability of the ink tends to be further improved.

A volatile water-soluble organic solvent is more preferable as the organic solvent. The organic solvent is not particularly limited, but specific examples thereof include alcohols or glycols such as glycerin, ethylene glycol, diethylene glycol, triethylene glycol, propylene glycol, dipropylene glycol, pentamethylene glycol, trimethylene glycol, 1,3-propanediol, 1,2-butanediol, 1,2-pentanediol, 1,2- hexanediol, 1,4-butanediol, 1,5-pentanediol, 1,6-hexanediol, 2-butene-1,4-diol, 2-ethyl-1,3-hexanediol, 2-methyl-2,4-pentanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; 1,1,3,3-tetramethyl urea, 1,3-propylene glycol; isopropylene glycol; isobutylene glycol; glycerin; mesoerythritol; and pentaerythritol.

The organic solvent may be used alone or in a combination of two or more thereof. The content of the organic solvent is not particularly limited and can be appropriately set as necessary. Among these, it is preferable to use one or more selected from the group consisting of 1,2-hexanediol, triethylene glycol monobutyl ether, and dipropylene glycol mono-propyl ether.

Further, it is preferable that the ink used in the present embodiment contain an organic solvent having a boiling point of preferably equal to or higher than 180° C., and more preferably equal to or higher than 200° C. When the organic solvent having such a boiling point is used, it is possible to obtain an ink that can maintain fluidity and re-dispersibility for a long period of time even if the ink is left in a state of coming into contact with air in an open state. Furthermore, such an ink hardly causes clogging of a nozzle in the middle of the recording or upon restarting after interruption of the recording, using a recording apparatus, and therefore, the ink becomes excellent in the discharge stability.

Surfactant

It is preferable that the ink used in the present embodiment contain a surfactant. The surfactant is not particularly limited, but preferable examples thereof include at least one selected from the group consisting of an acetylene glycol-based surfactant, a fluorine-based surfactant, and a silicone-based surfactant.

Among these, the silicone-based surfactant is more preferable because its solubility in the ink becomes high and foreign materials are hardly generated in the ink.

The acetylene glycol-based surfactant is not particularly limited, but preferable examples thereof include one or more selected from 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol and an alkylene oxide adduct of 2,4-dimethyl-5-decyne-4-ol. The commercially available products of the fluorine-based surfactant are not particularly limited, but examples thereof include an Olfine 104 series or an E series such as Olfine E1010 (trade name, manufactured by Air Products Japan, Inc.), and Surfynol 465 or Surfynol 61 (trade name, manufactured by Nissin Chemical Industry Co., Ltd.). The acetylene glycol-based surfactant may be used alone or in a combination of two or more thereof.

The fluorine-based surfactant is not particularly limited, but examples thereof include perfluoroalkyl sulfonate, perfluoroalkyl carboxylate, perfluoroalkyl phosphate, a perfluoroalkyl ethylene oxide adduct, perfloroalkyl betaine, and a perfluoroalkyl amine oxide compound. The commercially available products of the fluorine-based surfactant are not particularly limited, but examples thereof include S-144 and S-145 (manufactured by Asahi Glass Co., Ltd.); FC-170C, FC-430, and Fluorad-FC4430 (manufactured by Sumitomo 3M, Ltd.); FSO, FSO-100, FSN, FSN-100, and FS-300 (manufactured by Dupont Co.); and FT-250 and FT-251 (Neos Co., Ltd.). The fluorine-based surfactant may be used alone or in a combination of two or more thereof.

Examples of the silicone-based surfactant include a polysiloxane-based compound, polyether-modified organosiloxane, and the like. The commercially available products of the silicone-based surfactant are not particularly limited, but specific examples thereof include BYK-306, BYK-307, BYK-333, BYK-341, BYK-345, BYK-346, BYK-347, BYK-348, and BYK-349 (trade name, manufactured by BYK K.K.); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, manufactured by Shin-Etsu Chemical Co., Ltd.).

The content of the above-described surfactant is preferably 0.1 mass % to 5 mass %, and more preferably 0.1 mass % to 3 mass %, based on the total mass (100 mass %) of the ink. When the content of the surfactant is within the above range, the wettability of the ink attached to the recording medium tends to be further improved.

Other Components

In the ink used in the present embodiment, in order to favorably maintain the storage stability and the discharge stability from the head, to improve the clogging, and to prevent the ink from deterioration, it is possible to appropriately add various additives such as dissolution aids, viscosity modifiers, pH adjusting agents, antioxidants, preservatives, anti-mold agents, corrosion inhibitors, and chelating agents for capturing a metal ion that influences the dispersion. It is preferable that the ink used in the present embodiment be a water-based ink which contains mostly water among the volatile components in terms of safety.

Recording Medium

The recording method according to the present embodiment is used for recording on a non-absorptive recording medium or a low-absorptive recording medium. An absorptive recording medium is inferior in water resistance, friction resistance, or the like, and in some cases, the manufacturing cost increases in a case of an absorptive recording medium which is constituted by providing a receiving layer of an ink onto the surface. On the other hand, the non-absorptive recording medium or the low-absorptive recording medium is excellent in the water resistance, the friction resistance, and reducing the manufacturing cost compared to the absorptive recording medium which is constituted by providing the receiving layer of the ink onto the surface. The bleeding is easily generated with the low-absorptive recording medium and the bleeding is further easily generated with the non-absorptive recording medium. It is difficult to satisfy both the generation of the bleeding and the recording speed. Therefore, it is advantageous that the recording method according to the present embodiment be used in the non-absorptive recording medium or the low-absorptive recording medium, and it is more advantageous that this recording method be used in the non-absorptive recording medium.

Here, the "low-absorptive recording medium" or the "non-absorptive recording medium" refers to a recording medium having an amount of water absorption of less than or equal to 10 mL/m² from the start of contact until 30 msec in a Bristow's method. The Bristow's method is the most common method as a method of measuring the amount of liquid absorption in a short period of time and is also employed in JAPAN TAPPI. The details of the test method are described in Standard No. 51, "Paper and Paperboard—Liquid Absorption Test Method—Bristow's method" of "JAPAN TAPPI Paper Pulp Test Methods, 2000 version".

In addition, the non-absorptive recording medium or the low-absorptive recording medium can also be classified in accordance with wettability of water on a recording surface. For example, the recording medium can be characterized by dripping 0.5 μL of a water droplet onto the recording surface of the recording medium to measure the reduction rate of a contact angle (comparing a contact angle at 0.5 msec after impact to a contact angle at 5 sec after the impact). More specifically, as characteristics of the recording medium, the non-absorbency of the "non-absorptive recording medium" indicates that the above-described reduction rate is lower than 1% and the low-absorbency of the "low-absorptive recording medium" indicates that the reduction rate is equal to or higher 1% and lower than 5%. In addition, the absorbency indicates that the above-described reduction rate is equal to or higher than 5%. It is possible to measure the contact angle using Portable Contact Angle Meter PCA-1 (manufactured by Kyowa Interface Science Co., Ltd.) or the like.

The low-absorptive recording medium is not particularly limited, but an example thereof includes coated paper in which a coating layer for receiving an oil-based ink is provided on the surface. Specifically, as the low-absorptive recording medium, there is a paper coated on the surface thereof with paint and having high beauty sensitivity and high flatness and smoothness, which is classified as a coated paper for printing in the "Statistical classification of production dynamics" of Ministry of Economy, Trade and Industry in Japan. As the paint, there is a mixture of a white pigment, which is an inorganic compound such as clay (kaolin) or calcium carbonate, and an adhesive (binder) such as starch. It is preferable that the application amount of the paint be 10 g/m² to 40 g/m². The coated paper is not particularly limited, but examples thereof include recording papers such as art paper, coated paper, matte paper, and cast paper.

The non-absorptive recording medium is not particularly limited, but examples thereof include a base material, such as a plastic film having no absorptive layer of an ink or a paper coated with plastic; and a base material attached with a plastic film. Examples of the plastic referred herein include polyvinyl chloride, polyethylene terephthalate, polycarbonate, polystyrene, polyurethane, polyethylene, polypropylene, and polyacrylate.

In addition to the above-described recording media, ink non-absorptive or low-absorptive recording media such as glass or plates of metals such as iron, silver, copper, and aluminum can also be used.

Ink Set

The ink set according to the present embodiment includes the first ink and the second ink used in the above-mentioned recording method, and further includes at least one of the first reaction liquid and the second reaction liquid used in the above-mentioned recording method. The reaction liquid included in the ink set may be the first reaction liquid or the second reaction liquid or may be a reaction liquid acting as both the first reaction liquid and the second reaction liquid. When such an ink set is used, in the case where a plurality of inks are recorded on a non-absorptive recording medium or a low-absorptive recording medium in a superimposed manner, bleeding among these inks can be prevented, cohesion unevenness of ink can be suppressed, and clogging of ink jet nozzles hardly occurs.

EXAMPLES

Hereinafter, the invention will be described in detail using Examples and Comparative Examples. The invention is not limited to the following Examples.

Materials for Reaction Liquid and Ink

Main materials for the reaction liquid and the ink used in the following Examples and Comparative Examples are as follows.

Pigment

White pigment: titanium dioxide, NanoTek® slurry manufactured by C.I. Kasei Co., Ltd.

Cyan pigment: C. I. Pigment Blue 15:3 Polyvalent Metal Salt

Magnesium sulfate heptahydrate (molecular weight 246.47 g/mol)

Calcium acetate monohydrate (molecular weight 176.18 g/mol)

Calcium nitrate tetrahydrate (molecular weight 164.09 g/mol)

Organic Acid

Succinic acid (molecular weight 118.09 g/mol) Surfactant

BYK 348 (silicone surfactant, manufactured by BYK Japan KK)

Resin Emulsion

Joncryl 62J (acrylic styrene-based resin, manufactured by BASF Japan, Ltd.)

Component Constituting Receiving Layer

SNOWTEX ZL (anionic colloidal silica, manufactured by Nissan Chemical Industries, Ltd.)

Cationic Resin

Arrow base CD-1200 (Cationic resin emulsion, manufactured by UNITIKA, LTD.)

Organic Solvent 1,2-hexane diol

Propylene glycol

Preparation of Reaction Liquid and Ink

Each of the materials was mixed in composition ratios (mass %) shown in the following Tables 1 to 4, and the mixture was sufficiently stirred to respectively obtain a first reaction liquid, a second reaction liquid, a first ink, and a second ink. Further, surface tension was measured using a surface tensiometer (manufactured by Kyowa Interface Science Co., Ltd., surface tensiometer CBVP-Z or the like) through a Wilhelmy method at a solution temperature of 25° C. Examples 1 to 20 and Comparative Examples 1 to 6

Converted equipment of PX-G930 (Seiko Epson Corp.) was used. The converted point is to install a heater to a platen so as to be able to heat a recording medium. A nozzle pitch was 180 dpi. The first reaction liquid, the first ink, the second reaction liquid, and the second ink were discharged in this order from each head through the ink jet method under the recording conditions shown in Tables 1 to 4, and were then respectively attached to a PET film "Lumirror S10" (trade name, thickness of 100 μm) manufactured by TORAY INDUSTRIES, INC. as the non-absorptive recording medium or NP coated paper (manufactured by Lintec Corporation) as the low-absorptive recording medium, thereby forming beta patterns. At this time, a pattern 1 to which only the first reaction liquid was attached, a pattern 2 to which the first reaction liquid and the first ink were attached in a superimposed manner, a pattern 3 to which the first reaction liquid, the first ink, and the second reaction liquid were attached in a superimposed manner, and a pattern 4 to which the first reaction liquid, the first ink, the second reaction liquid, and the second ink were attached in a superimposed manner were respectively formed. The patterns 2 to 4 were simultaneously formed so as to come into contact with each other.

Specifically, in a case of forming the pattern 4, a reaction liquid was attached while adjusting the temperature of the recording medium to be the temperatures in Tables 1 to 4 in advance to form a pattern composed of the reaction liquid; a first ink was subsequently attached on the pattern composed of the reaction liquid to form a pattern composed of the first reaction liquid and the first ink; a second reaction liquid was subsequently attached on the pattern composed of the first reaction liquid and the first ink to form a pattern composed of the first reaction liquid, the first ink, and the second reaction liquid; and a second ink was finally attached on the pattern composed of the first reaction liquid, the first ink, and the second reaction liquid to form the pattern 4 composed of the first reaction liquid, the first ink, the second reaction liquid, and the second ink. The temperature of the recording medium was adjusted using the platen heater so as to maintain the surface temperature to be the surface temperatures in Tables 1 to 4 even while attaching the first reaction liquid, the second reaction liquid, the first ink, and the second ink (heat assist). In addition, after the first ink attaching process and before the start of the second ink attaching process (at the time of the start thereof), the contents of the volatile components of the reaction liquid and the first ink on the recording medium were adjusted to allow dryness factor to be the values in Tables 1 to 4 to perform the second ink attaching process. Further, recording resolution was set to 720×720 dpi and the amount of the reaction liquid and the amount of the ink per dot were adjusted to allow the application amount of the reaction liquid and the application amount of the color material to be the application amounts (attachment amounts) shown in the Tables. Further, the application amount of the coagulant of the first reaction liquid of Example 11 in Table 2 and the application amount of the coagulant of the first reaction liquid of Example 18 in Table 3 respectively are clearly $145.7 \times 10^{-5}$ (mmol/inch$^2$) when they are calculated from the application amount of liquid in the first reaction liquid and the composition ratio of the first reaction liquid. Further, the application amount of liquid of the second ink of Example 19 in Table 3 is clearly 14 mg/inch$^2$, when it is calculated from the application amount of a color material in the second ink and the composition ratio of the second ink.

Dryness Factor of Volatile Components Contained in First Reaction Liquid and First Ink The dryness factor of volatile components contained in the first reaction liquid and the first ink in the pattern 2 after the first ink attaching process and before the second ink attaching process (at the time of transporting the recording medium to the position facing a head for the second ink) was calculated by the following Formula. Here, Af is the total attachment amount (mg) of the first reaction liquid and the first ink in a region in which the first reaction liquid and the first ink are attached to the recording medium in a superimposed manner. In addition, Ae is the total amount of residue of the first reaction liquid and the first ink on the recording medium in a state where the first reaction liquid and the first ink were dried (volatilized), specifically, in a state where the first reaction liquid and the first ink were dried at 100° C. for 60 minutes, until the recorded matter becomes a state to be sufficiently ready for use. Furthermore, A is the total amount of the first reaction liquid and the first ink on the recording medium immediately before the second reaction liquid attaching process.

Dryness factor % of the volatile component=$((Af-A)/(Af-Ae)) \times 100$

Af can be obtained from discharge data of a printer and the mass per dot as the attachment amount of the first reaction liquid and the first ink in the pattern 3. A can be obtained by measuring the mass of the recording medium at the time of starting the attaching of the second reaction liquid and the mass of the recording medium before the first reaction liquid attaching process and then calculating the difference therebetween. At the time of measuring the dryness factor of volatile components, it is simple to use the recording medium prepared for the measurement. The measurement was performed using an electronic balance. When performing the measurement, the relationship between drying time and dryness factor at the time of heating and drying the first reaction liquid and the first ink using the platen after attaching the first reaction liquid and the first ink was previously determined and used. When performing the recording using the recording apparatus, desired dryness factor was controlled by setting the time between the attaching of the first reaction liquid and the first ink and the attaching of the second reaction liquid to be any time of the relationship between the drying time and the dryness factor obtained as above.

Evaluation

Bleeding at the Time of Recording First Ink and Second Ink in Superimposed Manner Recorded matters were respectively obtained by setting the application amount (shown in Tables 1 to 4) of a color material contained in the second ink as 100% and varying the application amount of the color material between 30% and 200% to control the attachment amount of the second ink in the pattern 4. The portion where the pattern 4 and the pattern 2 of the obtained recorded matter come into contact with each other was visually observed in order to evaluate the bleeding at the time of recording the first ink and the second ink in a superimposed manner using the following evaluation criteria. "200%" is a value obtained by assuming a maximum attachment amount of the total of a plurality of colors of inks in a case where a secondary color or higher are recorded using a plurality of color inks.

Evaluation Criteria

AA: There is no color mixing even if the application amount of a color material contained in the second ink is 200%.

A: There is no color mixing if the application amount of a color material contained in the second ink is up to 100%.

B: There is no color mixing if the application amount of a color material contained in the second ink is up to 50%.

C: Color mixing occurs even if the application amount of a color material contained in the second ink is 30%.

Precipitation of First Reaction Liquid on Recording Medium

The precipitation of the first reaction liquid on the recording medium was evaluated according to the following evaluation criteria, after visually observing the pattern 1.

Evaluation Criteria

A: The precipitation is not recognized.

B: The precipitation is recognized, but the cloudiness is not recognized.

C: The precipitation and the cloudiness are recognized.

Cloudiness of Image Portion

The cloudiness of the portion (image portion) to which an ink was attached was evaluated according to the following evaluation criteria, after visually observing the pattern 4.

Evaluation Criteria

A: The cloudiness is not recognized.

B: The cloudiness is recognized.

Cohesion Unevenness of First Ink on Recording Medium

The cohesion unevenness (unevenness in solid) of the first ink on the recording medium was evaluated according to the following evaluation criteria, after visually observing the pattern 2.

Evaluation Criteria

A: Cohesion unevenness is not recognized in the first ink.

B: Slight cohesion unevenness is recognized in the first ink.

B': It is recognized that a prominent portion of cohesion unevenness exists in the first ink in a patchy fashion.

C: Considerable cohesion unevenness is wholly recognized in the first ink.

Bad Odor of Recorded Matter

The bad odor of the recorded matter was evaluated according to the following evaluation criteria, after performing sensory evaluation on the pattern 4.

Evaluation Criteria

A: There is no bad odor.

B: There is a slight bad odor.

C: There is a considerable bad odor.

Stickiness of Recorded Matter

The stickiness of the recorded matter was evaluated according to the following criteria, based on the degree of adherence thereof after superimposing the printed surfaces of the pattern 4.

Evaluation Criteria

A: There is no adherence between two printed surfaces even if they are left for 1 day in a state of being superimposed (there is no stickiness).

B: After the two printed surfaces are left for 1 day in the state of being superimposed, the two printed surfaces are adhered to each other when one surface is lifted, but one surface is peeled off within 1 minute (there is slight stickiness).

C: After the two printed surfaces are left for 1 day in the state of being superimposed, the two printed surfaces are adhered to each other when one surface is lifted, and one surface is not peeled off even after 1 minute (there is stickiness).

Recording Speed

The recording speed was evaluated based on a recording speed at which the pattern 4 can be obtained, according to the following evaluation criteria.

Evaluation Criteria

A: The pattern 4 can be recorded on an A4-size recording medium in less than 30 seconds.

B: The pattern 4 can be recorded on an A4-size recording medium in 30 seconds to 1 minute.

C: The pattern 4 can be recorded on an A4-size recording medium if the time exceeds 1 minute.

Clogging Reliability

Clogging reliability was evaluated according to the following criteria, after recording the pattern 4 on 50 sheets of A4-sized recording media and then visually observing a nozzle.

Evaluation Criteria

A: Neither nozzle slip-out nor nozzle bending occurs even if the pattern 4 is recorded on 50 sheets of the recording media.

B: The nozzle slip-out did not occur, but the nozzle bending occurs if the pattern 4 is recorded on 50 sheets of the recording media.

C: The nozzle slip-out and the nozzle bending occur if the pattern 4 is recorded on 50 sheets of the recording media.

TABLE 1

| | | Examples | | | | | | | | | | | | | | | |
|---|---|---|---|---|---|---|---|---|---|---|---|---|---|---|---|---|---|
| | | Ink | | | | | | | | | | | | | | | |
| | | 1 | | | | 2 | | | | 3 | | | | 4 | | | |
| | | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Coagulant | Magnesium sulfate heptahydrate | 0.5 | 0.0 | 0.2 | 0.0 | 1.0 | 0.0 | 0.4 | 0.0 | 3.0 | 0.0 | 1.2 | 0.0 | 10.0 | 0.0 | 6.0 | 0.0 |
| | Calcium acetate monohydrate | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Calcium nitrate tetrahydrate | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Succinic acid | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 | 0.0 | 10.0 | 0.0 | 0.0 |
| | Color pigment (cyan) | 0.0 | 0.0 | 0.0 | 4.0 | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | Propylene glycol | 18.0 | 10.0 | 18.0 | 15.0 | 18.0 | 10.0 | 18.0 | 15.0 | 18.0 | 10.0 | 18.0 | 15.0 | 18.0 | 10.0 | 18.0 | 15.0 |
| Water | | balance | balance | balance | balance | balance | balance | balance | balance | balance | balance | balance | balance | balance | balance | balance | balance |
| Total | | 100 | 100 | 100 | 100 | 100 | 100 | 100 | 100 | 100 | 100 | 100 | 100 | 100 | 100 | 100 | 100 |

TABLE 1-continued

| Recording medium | Lumirror S10 room temperature (25° C.) | | | | Lumirror S10 room temperature (25° C.) | | | | Lumirror S10 room temperature (25° C.) | | | | Lumirror S10 room temperature (25° C.) | | | |
|---|---|---|---|---|---|---|---|---|---|---|---|---|---|---|---|---|
| Surface temperature of recording medium during recording (heat assist) | | | | | | | | | | | | | | | | |
| Dryness factor | 95% | | | | 95% | | | | 95% | | | | 95% | | | |
| Surface tension of first reaction liquid (mN/m) | 35 | | | | 35 | | | | 35 | | | | 35 | | | |
| Application amount of liquid (mg/inch²) | 2 | 14 | 2 | 14 | 2 | 14 | 2 | 14 | 2 | 14 | 2 | 14 | 2 | 14 | 2 | 14 |
| Application amount of color material (mg/inch²) | | 1.4 | | 0.56 | | 1.4 | | 0.56 | | 1.4 | | 0.56 | | 1.4 | | 0.56 |
| Application amount of coagulant (×10⁻⁵ mmol/inch²) | 4.1 | | 1.6 | | 8.2 | | 3.2 | | 24.3 | | 9.7 | | 81.1 | | 48.7 | |
| Total amount of component constituting receiving layer and cationic resin (mg/inch²) | | | | | | | | | | | | | | | | |
| Ratio A | 34506 | | | | 17253 | | | | 5751 | | | | 1725 | | | |
| Ratio B | 34506 | | | | 17253 | | | | 5751 | | | | 1150 | | | |
| Ratio C | — | | | | — | | | | — | | | | — | | | |
| Unevenness in solid of first ink on recording medium | B | | | | A | | | | A | | | | A | | | |
| Bleeding at the time of recording first ink and second ink in superimposed manner | B | | | | A | | | | AA | | | | AA | | | |
| Precipitation of first reaction liquid on recording medium | A | | | | A | | | | A | | | | B | | | |
| Cloudiness of image portion | A | | | | A | | | | A | | | | B | | | |
| Bad odor of recorded matter | A | | | | A | | | | A | | | | A | | | |
| Stickiness of recorded matter | A | | | | A | | | | A | | | | A | | | |
| Recording speed | C | | | | C | | | | C | | | | C | | | |
| Clogging reliability | A | | | | A | | | | A | | | | A | | | |

| | | Examples | | | | | | | | |
|---|---|---|---|---|---|---|---|---|---|---|
| | | 5 | | | | 6 | | | 7 | |
| | | | | | | Ink | | | | |
| | | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Coagulant | Magnesium sulfate heptahydrate | 0.0 | 0.0 | 0.0 | 0.0 | 0.0 | 0.0 | 0.0 | 0.0 | 0.0 | 0.0 | 0.0 | 0.0 |
| | Calcium acetate monohydrate | 0.7 | 0.0 | 0.3 | 0.0 | 2.1 | 0.0 | 0.8 | 0.0 | 0.0 | 0.0 | 0.0 | 0.0 |

TABLE 1-continued

| | | Col1 | Col2 | Col3 | Col4 | Col5 | Col6 | Col7 | Col8 | Col9 |
|---|---|---|---|---|---|---|---|---|---|---|
| Color material | Calcium nitrate tetrahydrate | 0.0 | 0.0 | 0.0 | 0.0 | 0.0 | 1.0 | 0.0 | 0.4 | 0.0 |
| | Succinic acid | 0.0 | 0.0 | 0.0 | 0.0 | 0.0 | 0.0 | 0.0 | 0.0 | 0.0 |
| | White pigment (titanium dioxide) | 0.0 | 10.0 | 0.0 | 0.0 | 10.0 | 0.0 | 10.0 | 0.0 | 0.0 |
| | Color pigment (cyan) | 0.0 | 0.0 | 4.0 | 0.0 | 0.0 | 4.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 2.0 | 0.0 | 4.0 | 2.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 |
| | Propylene glycol | 18.0 | 10.0 | 15.0 | 18.0 | 10.0 | 15.0 | 10.0 | 18.0 | 15.0 |
| Water | | balance | balance | balance | balance | balance | balance | balance | balance | balance |
| Total | | 100 | 100 | 100 | 100 | 100 | 100 | 100 | 100 | 100 |
| Recording medium | | Lumirror S10 | | | | | | | | |
| Surface temperature of recording medium during recording (heat assist) | | room temperature (25° C.) | | | | | | | | |
| Dryness factor | | 95% | | | | | | | | |
| Surface tension of first reaction liquid (mN/m) | | 35 | | | | | | | | |
| Application amount of liquid (mg/inch²) | | 2 | 2 | 2 | 2 | 2 | 2 | 2 | 2 | 2 |
| Application amount of color material (mg/inch²) | | 14 | 14 | 14 | 14 | 14 | 14 | 14 | 14 | 14 |
| Application amount of coagulant (×10⁻⁵ mmol/inch²) | | 7.9 | 3.4 | 0.56 | 23.8 | 9.1 | 0.56 | 8.5 | 3.4 | 0.56 |
| Total amount of component constituting receiving layer and cationic resin (mg/inch²) | | 1.4 | 1.4 | 0.56 | 1.4 | 1.4 | 0.56 | 1.4 | 1.4 | 0.56 |
| Ratio A | | — | — | — | — | — | — | — | — | — |
| Ratio B | | 17618 | 5873 | | | | | 16531 | | |
| Ratio C | | 16443 | 6166 | | | | | 16531 | | |
| Unevenness in solid of first ink on recording medium | | A | A | A | A | A | A | A | A | A |

TABLE 1-continued

| | | | |
|---|---|---|---|
| Bleeding at the time of recording first ink and second ink in superimposed manner | A | AA | A |
| Precipitation of first reaction liquid on recording medium | A | A | A |
| Cloudiness of image portion | A | A | A |
| Bad odor of recorded matter | A | B | A |
| Stickiness of recorded matter | A | A | A |
| Recording speed | C | C | C |
| Clogging reliability | A | A | A |

TABLE 2

| | | Examples | | | | | | | | | | | | | | | |
|---|---|---|---|---|---|---|---|---|---|---|---|---|---|---|---|---|---|
| | | 8 | | | | 9 | | | | 10 | | | | 11 | | | |
| | | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Ink | | | | | | | | | | | | | | | | | |
| Coagulant | Magnesium sulfate heptahydrate | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Calcium acetate monohydrate | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | Calcium nitrate tetrahydrate | 3.0 | 0.0 | 1.1 | 0.0 | 0.0 | 0.0 | 0.0 | 0.0 | 0.0 | 0.0 | 1.7 | 0.0 | 0.0 | 0.0 | 3.4 | 0.0 |
| | Succinic acid | 0.0 | 0.0 | 0.0 | 0.0 | 1.4 | 0.0 | 0.0 | 0.0 | 4.3 | 0.0 | 0.0 | 0.0 | 8.6 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 | 0.0 | 10.0 | 0.0 | 0.0 |
| | Color pigment (cyan) | 0.0 | 0.0 | 0.0 | 4.0 | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | Propylene glycol | 18.0 | 10.0 | 18.0 | 15.0 | 18.0 | 10.0 | 18.0 | 15.0 | 18.0 | 10.0 | 18.0 | 15.0 | 18.0 | 10.0 | 18.0 | 15.0 |
| | Water | balance | balance | balance | balance | balance | balance | balance | balance | balance | balance | balance | balance | balance | balance | balance | balance |
| | Total | 100 | 100 | 100 | 100 | 100 | 100 | 100 | 100 | 100 | 100 | 100 | 100 | 100 | 100 | 100 | 100 |
| Recording medium | | Lumirror S10 | | | | Lumirror S10 | | | | Lumirror S10 | | | | Lumirror S10 | | | |
| Surface temperature of recording medium during recording (heat assist) | | room temperature (25° C.) | | | | room temperature (25° C.) | | | | room temperature (25° C.) | | | | room temperature (25° C.) | | | |
| Dryness factor | | 95% | | | | 95% | | | | 95% | | | | 95% | | | |
| Surface tension of first reaction liquid (mN/m) | | 35 | | | | 35 | | | | 35 | | | | 35 | | | |
| Application amount of liquid (mg/inch²) | | 2 | 14 | 2 | 14 | 2 | 14 | 2 | 14 | 2 | 14 | 2 | 14 | 2 | 14 | 2 | 14 |
| Application amount of color material (mg/inch²) | | | 1.4 | | 0.56 | | 1.4 | | 0.56 | | 1.4 | | 0.56 | | 1.4 | | 0.56 |
| Application amount of coagulant (×10⁻⁵ mmol/inch²) | | 25.4 | | 9.3 | | 23.7 | | 10.2 | | 72.8 | | 28.8 | | ##### | | 57.6 | |
| Total amount of component constituting receiving layer and cationic resin (mg/inch²) | | | | | | | | | | | | | | | | | |
| Ratio A | | 5510 | | | | 5905 | | | | 1922 | | | | 961 | | | |
| Ratio B | | 6011 | | | | 5511 | | | | 1945 | | | | 973 | | | |

TABLE 2-continued

| | Example 12 | Example 13 | Example 14 |
|---|---|---|---|
| Ratio C | — | — | — |
| Unevenness in solid of first ink on recording medium | A | A | A |
| Bleeding at the time of recording first ink and second ink in superimposed manner | AA | A | AA |
| Precipitation of first reaction liquid on recording medium | B | A | B |
| Cloudiness of image portion | A | A | B |
| Bad odor of recorded matter | A | A | A |
| Stickiness of recorded matter | B | A | A |
| Recording speed | C | C | C |
| Clogging reliability | A | A | A |

| | | Examples |||||||||||
|---|---|---|---|---|---|---|---|---|---|---|---|---|
| | | 12 |||| 13 Ink |||| 14 ||||
| | | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Coagulant | Magnesium sulfate heptahydrate | 1.0 | 0.0 | 0.0 | 0.0 | 1.0 | 0.0 | 0.0 | 0.0 | 1.0 | 0.0 | 0.0 | 0.0 |
| | Calcium acetate monohydrate | 0.0 | 0.0 | 0.4 | 0.0 | 0.0 | 0.0 | 0.4 | 0.0 | 0.0 | 0.0 | 0.4 | 0.0 |
| | Calcium nitrate tetrahydrate | 0.0 | 0.0 | 0.0 | 0.0 | 0.0 | 0.0 | 0.0 | 0.0 | 0.0 | 0.0 | 0.0 | 0.0 |
| | Succinic acid | 0.0 | 0.0 | 0.0 | 0.0 | 0.0 | 0.0 | 0.0 | 0.0 | 0.0 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 |
| | Color pigment (cyan) | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 5.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 5.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 |
| | Propylene glycol | 18.0 | 10.0 | 18.0 | 15.0 | 18.0 | 10.0 | 18.0 | 15.0 | 18.0 | 10.0 | 18.0 | 15.0 |
| | Water | balance | balance | balance | balance | balance | balance | balance | balance | balance | balance | balance | balance |
| Total | | 100 | 100 | 100 | 100 | 100 | 100 | 100 | 100 | 100 | 100 | 100 | 100 |
| Recording medium | | Lumirror S10 |||| Lumirror S10 |||| Lumirror S10 ||||
| Surface temperature of recording medium during recording (heat assist) | | room temperature (25° C.) |||| room temperature (25° C.) |||| room temperature (25° C.) ||||
| Dryness factor | | 95% |||| 95% |||| 95% ||||
| Surface tension of first reaction liquid (mN/m) | | 35 |||| 35 |||| 35 ||||

TABLE 2-continued

| Application amount of liquid (mg/inch²) | 2 | 14 | 2 | 14 | 2 | 14 | 2 | 14 | 2 | 14 |
|---|---|---|---|---|---|---|---|---|---|---|
| Application amount of color material (mg/inch²) | 8.1 | 1.4 | 4.5 | 0.56 | 8.1 | 1.4 | 3.2 | 0.56 | 8.1 | 1.4 | 3.2 | 0.56 |
| Application amount of coagulant (×10⁻⁵ mmol/inch²) | | | | | | | | | | |
| Total amount of component constituting receiving layer and cationic resin (mg/inch²) | | | | | 0.10 | | | 0.10 | | |
| Ratio A | | | 17253 | | | | 17253 | | | | 17253 |
| Ratio B | | | 12333 | | | | 17253 | | | | 17253 |
| Ratio C | | | — | | | | — | | | | — |
| Unevenness in solid of first ink on recording medium | | | A | | | | A | | | | A |
| Bleeding at the time of recording first ink and second ink in superimposed manner | | | A | | | | AA | | | | AA |
| Precipitation of first reaction liquid on recording medium | | | A | | | | A | | | | A |
| Cloudiness of image portion | | | A | | | | A | | | | A |
| Bad odor of recorded matter | | | A | | | | A | | | | A |
| Stickiness of recorded matter | | | C | | | | C | | | | C |
| Recording speed | | | A | | | | A | | | | A |
| Clogging reliability | | | | | | | | | | |

TABLE 3

| | | Examples | | | | | | | | | | | |
|---|---|---|---|---|---|---|---|---|---|---|---|---|
| | | 15 | | | | 16 | | | | 17 | | | |
| | | | | | | Ink | | | | | | | |
| | | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Coagulant | Magnesium sulfate heptahydrate | 1.0 | 0.0 | 0.4 | 0.0 | 1.0 | 0.0 | 0.4 | 0.0 | 1.0 | 0.0 | 0.4 | 0.0 |
| | Calcium acetate monohydrate | 0.0 | 0.0 | 0.0 | 0.0 | 0.0 | 0.0 | 0.0 | 0.0 | 0.0 | 0.0 | 0.0 | 0.0 |
| | Calcium nitrate tetrahydrate | 0.0 | 0.0 | 0.0 | 0.0 | 0.0 | 0.0 | 0.0 | 0.0 | 0.0 | 0.0 | 0.0 | 0.0 |
| | Succinic acid | 0.0 | 0.0 | 0.0 | 0.0 | 0.0 | 0.0 | 0.0 | 0.0 | 0.0 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 |
| | Color pigment (cyan) | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 |
| | Propylene glycol | 18.0 | 10.0 | 18.0 | 15.0 | 18.0 | 10.0 | 18.0 | 15.0 | 18.0 | 10.0 | 18.0 | 15.0 |
| | Water | balance | balance | balance | balance | balance | balance | balance | balance | balance | balance | balance | balance |
| | Total | 100 | 100 | 100 | 100 | 100 | 100 | 100 | 100 | 100 | 100 | 100 | 100 |
| | Recording medium | Lumirror S10 | | | | Lumirror S10 | | | | Lumirror S10 | | | |
| | Surface temperature of recording medium during recording (heat assist) | 45° C. | | | | room temperature (25° C.) | | | | room temperature (25° C.) | | | |
| | Dryness factor | 95% | | | | 80% | | | | 10% | | | |
| | Surface tension of first reaction liquid (mN/m) | 35 | | | | 35 | | | | 35 | | | |
| | Application amount of liquid (mg/inch$^2$) | 2 | 14 | 2 | 14 | 2 | 14 | 2 | 14 | 2 | 14 | 2 | 14 |
| | Application amount of color material (mg/inch$^2$) | | 1.4 | | 0.56 | | 1.4 | | 0.56 | | 1.4 | | 0.56 |
| | Application amount of coagulant ($\times 10^{-5}$ mmol/inch$^2$) | 8.1 | | 3.2 | | 8.1 | | 3.2 | | 8.1 | | 3.2 | |
| | Total amount of component constituting receiving layer and cationic resin (mg/inch$^2$) | | | | | | | | | | | | |
| | Ratio A | 17253 | | | | 17253 | | | | 17253 | | | |
| | Ratio B | 17253 | | | | 17253 | | | | 17253 | | | |
| | Ratio C | — | | | | — | | | | — | | | |
| | Unevenness in solid of first ink on recording medium | A | | | | A | | | | B | | | |
| | Bleeding at the time of recording first ink and second ink in superimposed manner | AA | | | | A | | | | B | | | |
| | Precipitation of first reaction liquid on recording medium | A | | | | A | | | | A | | | |
| | Cloudiness of image portion | A | | | | A | | | | A | | | |
| | Bad odor of recorded matter | A | | | | A | | | | A | | | |
| | Stickiness of recorded matter | A | | | | A | | | | A | | | |
| | Recording speed | B | | | | B | | | | A | | | |
| | Clogging reliability | B | | | | A | | | | A | | | |

| | | Examples | | | | | | | | | | | |
|---|---|---|---|---|---|---|---|---|---|---|---|---|---|
| | | 18 | | | | 19 | | | | 20 | | | |
| | | | | | | Ink | | | | | | | |
| | | First reaction liquid | (color) | Second reaction liquid | Second ink (white) | First reaction liquid | First ink (white) | Second reaction liquid | Second ink (white) | First reaction liquid | First ink (white) | Second reaction liquid | Second ink (color) |
| Coagulant | Magnesium sulfate heptahydrate | 0.4 | 0.0 | 1.0 | 0.0 | 0.0 | 0.0 | 0.0 | 0.0 | 1.0 | 0.0 | 0.4 | 0.0 |

TABLE 3-continued

|  |  |  |  |  |  |  |  |  |  |  |  |  |  |
|---|---|---|---|---|---|---|---|---|---|---|---|---|---|
|  | Calcium acetate monohydrate | 0.0 | 0.0 | 0.0 | 0.0 | 0.0 | 0.0 | 0.0 | 0.0 | 0.0 | 0.0 | 0.0 | 0.0 |
|  | Calcium nitrate tetrahydrate | 0.0 | 0.0 | 0.0 | 0.0 | 0.0 | 0.0 | 0.0 | 0.0 | 0.0 | 0.0 | 0.0 | 0.0 |
|  | Succinic acid | 0.0 | 0.0 | 0.0 | 0.0 | 8.6 | 0.0 | 3.4 | 0.0 | 0.0 | 0.0 | 0.0 | 0.0 |
| Color material | White pigment (titanium dioxide) | 0.0 | 0.0 | 0.0 | 10.0 | 0.0 | 10.0 | 0.0 | 0.0 | 0.0 | 10.0 | 0.0 | 0.0 |
|  | Color pigment (cyan) | 0.0 | 4.0 | 0.0 | 0.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.0 | 0.6 | 0.6 | 0.6 |
| Resin emulsion | Styrene acryl-based resin | 0.0 | 2.0 | 0.0 | 4.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 |
|  | Propylene glycol | 18.0 | 10.0 | 18.0 | 15.0 | 18.0 | 10.0 | 18.0 | 15.0 | 18.0 | 10.0 | 18.0 | 15.0 |
|  | Water | balance | balance | balance | balance | balance | balance | balance | balance | balance | balance | balance | balance |
|  | Total | 100 | 100 | 100 | 100 | 100 | 100 | 100 | 100 | 100 | 100 | 100 | 100 |
|  | Recording medium | | Lumirror S10 | | | | NP coated paper | | | | Lumirror S10 | | |
|  | Surface temperature of recording medium during recording (heat assist) | | room temperature (25° C.) | | | | room temperature (25° C.) | | | | room temperature (25° C.) | | |
|  | Dryness factor | | 95% | | | | 95% | | | | 95% | | |
|  | Surface tension of first reaction liquid (mN/m) | | 35 | | | | 35 | | | | 65 | | |
|  | Application amount of liquid (mg/inch$^2$) | 2 | 14 | 2 | 14 | 2 | 14 | 2 | #### | 2 | 14 | 2 | 14 |
|  | Application amount of color material (mg/inch$^2$) | | 0.56 | | 1.4 | | 1.4 | | 0.56 | | 1.4 | | 0.56 |
|  | Application amount of coagulant ($\times 10^{-5}$ mmol/inch$^2$) | 3.2 | | 8.1 | | #### | | 57.6 | | 8.1 | | 3.2 | |
|  | Total amount of component constituting receiving layer and cationic resin (mg/inch$^2$) | | | | | | | | | | | | |
|  | Ratio A | | 17253 | | | | 961 | | | | 17253 | | |
|  | Ratio B | | 17253 | | | | 973 | | | | 17253 | | |
|  | Ratio C | | — | | | | — | | | | — | | |
|  | Unevenness in solid of first ink on recording medium | | A | | | | A | | | | B' | | |
|  | Bleeding at the time of recording first ink and second ink in superimposed manner | | A | | | | A | | | | B | | |
|  | Precipitation of first reaction liquid on recording medium | | A | | | | A | | | | C | | |
|  | Cloudiness of image portion | | A | | | | A | | | | B | | |
|  | Bad odor of recorded matter | | A | | | | A | | | | A | | |
|  | Stickiness of recorded matter | | A | | | | A | | | | A | | |
|  | Recording speed | | C | | | | C | | | | C | | |
|  | Clogging reliability | | A | | | | A | | | | A | | |

TABLE 4

|  |  | Comparative Examples ||||||||||||
|  |  | 1 |||| 2 |||| 3 ||||
|  | Ink | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
|---|---|---|---|---|---|---|---|---|---|---|---|---|---|
| Coagulant | Magnesium sulfate heptahydrate | 0.0 | 0.0 | 0.0 | 0.0 | 0.0 | 0.0 | 0.4 | 0.0 | 1.0 | 0.0 | 0.0 | 0.0 |
|  | Calcium acetate monohydrate | 0.0 | 0.0 | 0.0 | 0.0 | 0.0 | 0.0 | 0.0 | 0.0 | 0.0 | 0.0 | 0.0 | 0.0 |
|  | Calcium nitrate tetrahydrate | 0.0 | 0.0 | 0.0 | 0.0 | 0.0 | 0.0 | 0.0 | 0.0 | 0.0 | 0.0 | 0.0 | 0.0 |
|  | Succinic acid | 0.0 | 0.0 | 0.0 | 0.0 | 0.0 | 0.0 | 0.0 | 0.0 | 0.0 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 |

TABLE 4-continued

|  |  |  |  |  |  |  |  |  |  |  |  |  |
|---|---|---|---|---|---|---|---|---|---|---|---|---|
|  | Color pigment (cyan) | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 |
| Organic solvent | 1,2-hexane diol | 3.0 | 3.0 | 3.0 | 3.0 | 3.0 | 3.0 | 3.0 | 3.0 | 3.0 | 3.0 | 3.0 | 3.0 |
|  | Propylene glycol | 18.0 | 10.0 | 18.0 | 15.0 | 18.0 | 10.0 | 18.0 | 15.0 | 18.0 | 10.0 | 18.0 | 15.0 |
|  | Water | balance | balance | balance | balance | balance | balance | balance | balance | balance | balance | balance | balance |
|  | Total | 100 | 100 | 100 | 100 | 100 | 100 | 100 | 100 | 100 | 100 | 100 | 100 |
| Recording medium |  | Lumirror S10 | | | | Lumirror S10 | | | | Lumirror S10 | | | |
| Surface temperature of recording medium during recording (heat assist) |  | room temperature (25° C.) | | | | room temperature (25° C.) | | | | room temperature (25° C.) | | | |
| Dryness factor |  | 95% | | | | 95% | | | | 95% | | | |
| Surface tension of first reaction liquid (mN/m) |  | 35 | | | | 35 | | | | 35 | | | |
| Application amount of liquid (mg/inch$^2$) |  | 2 | 14 | 2 | 14 | 2 | 14 | 2 | 14 | 2 | 14 | 2 | 14 |
| Application amount of color material (mg/inch$^2$) |  |  | 1.4 |  | 0.56 |  | 1.4 |  | 0.56 |  | 1.4 |  | 0.56 |
| Application amount of coagulant ($\times 10^{-5}$ mmol/inch$^2$) |  | 0.00 | | | | 0.00 | | 3.25 | | 8.11 | | 0.00 | |
| Total amount of component constituting receiving layer and cationic resin (mg/inch$^2$) |  | | | | | | | | | | | | |
| Ratio A |  | — | | | | — | | | | 17253 | | | |
| Ratio B |  | — | | | | 17253 | | | | — | | | |
| Ratio C |  | — | | | | — | | | | — | | | |
| Unevenness in solid of first ink on recording medium |  | C | | | | C | | | | B | | | |
| Bleeding at the time of recording first ink and second ink in superimposed manner |  | C | | | | A | | | | C | | | |
| Precipitation of first reaction liquid on recording medium |  | A | | | | A | | | | A | | | |
| Cloudiness of image portion |  | A | | | | A | | | | A | | | |
| Bad odor of recorded matter |  | A | | | | A | | | | A | | | |
| Stickiness of recorded matter |  | A | | | | A | | | | A | | | |
| Recording speed |  | C | | | | C | | | | C | | | |
| Clogging reliability |  | A | | | | A | | | | A | | | |

| | | Comparative Examples | | | | | | | | | | |
|---|---|---|---|---|---|---|---|---|---|---|---|---|
| | | 4 | | | | 5 | | | | 6 | | | |
| | Ink | First reaction liquid | First ink (white) | Second reaction liquid | Second ink (color) | First reaction liquid | First ink (white) | Second reaction liquid | Second ink (color) | First reaction liquid | First ink (white) | Second reaction liquid | Second ink (color) |
| Coagulant | Magnesium sulfate heptahydrate | 0.0 | 0.0 | 0.0 | 0.0 | 0.0 | 0.0 | 0.0 | 0.0 | 1.0 | 0.0 | 0.0 | 0.0 |
|  | Calcium acetate monohydrate | 0.0 | 0.0 | 0.0 | 0.0 | 0.0 | 0.0 | 0.0 | 0.0 | 0.0 | 0.0 | 0.0 | 0.0 |
|  | Calcium nitrate tetrahydrate | 0.0 | 0.0 | 0.0 | 0.0 | 0.0 | 0.0 | 0.0 | 0.0 | 0.0 | 0.0 | 0.0 | 0.0 |
|  | Succinic acid | 0.0 | 0.0 | 0.0 | 0.0 | 0.0 | 0.0 | 0.0 | 0.0 | 0.0 | 0.0 | 0.0 | 0.0 |
| Color material | White pigment (titanium dioxide) | 0.0 | 10.0 | 0.0 | 0.0 | 0.0 | 10.0 | 0.0 | 0.0 | 0.0 | 10.0 | 0.0 | 0.0 |
|  | Color pigment (cyan) | 0.0 | 0.0 | 0.0 | 4.0 | 0.0 | 0.0 | 0.0 | 4.0 | 0.0 | 0.0 | 0.0 | 4.0 |
| Surfactant | BYK 348 | 0.6 | 0.6 | 0.6 | 0.6 | 0.6 | 0.6 | 0.6 | 0.6 | 0.6 | 0.6 | 0.6 | 0.6 |
| Resin emulsion | Styrene acryl-based resin | 0.0 | 4.0 | 0.0 | 2.0 | 0.0 | 4.0 | 0.0 | 2.0 | 0.0 | 4.0 | 0.0 | 2.0 |
| Component constituting receiving layer | SNOWTEX ZL | 0.0 | 0.0 | 0.0 | 0.0 | 0.0 | 0.0 | 0.0 | 0.0 | 0.0 | 0.0 | 0.0 | 0.0 |
| Cationic particle | Arrow base CD-1200 | 0.0 | 0.0 | 0.0 | 0.0 | 0.0 | 0.0 | 0.0 | 0.0 | 0.0 | 0.0 | 0.0 | 0.0 |

TABLE 4-continued

| | | | | | | | | | | | | |
|---|---|---|---|---|---|---|---|---|---|---|---|---|
| Organic solvent | 1,2-hexane diol | 3.0 | 3.0 | 3.0 | 3.0 | 3.0 | 3.0 | 3.0 | 3.0 | 3.0 | 3.0 | 3.0 |
| | Propylene glycol | 18.0 | 10.0 | 18.0 | 15.0 | 18.0 | 10.0 | 18.0 | 15.0 | 18.0 | 10.0 | 15.0 |
| | Water | balance | balance | balance | balance | balance | balance | balance | balance | balance | balance | balance |
| Total | | 100 | 100 | 100 | 100 | 100 | 100 | 100 | 100 | 100 | 100 | 100 |
| Recording medium | | Lumirror S10 | | | | Lumirror S10 | | | | Lumirror S10 | | |
| Surface temperature of recording medium during recording (heat assist) | | 45° C. | | | | 70° C. | | | | room temperature (25° C.) | | |
| Dryness factor | | 80% | | | | 95% | | | | 95% | | |
| Surface tension of first reaction liquid (mN/m) | | 35 | | | | 35 | | | | 35 | | |
| Application amount of liquid (mg/inch$^2$) | | 2 | 14 | 2 | 14 | 2 | 14 | 2 | 14 | 2 | 14 | 14 |
| Application amount of color material (mg/inch$^2$) | | | 1.4 | | 0.56 | | 1.4 | | 0.56 | | 1.4 | 0.56 |
| Application amount of coagulant (×10$^{-5}$ mmol/inch$^2$) | | 0.00 | | 0.00 | | 0.00 | | 0.00 | | 8.11 | | |
| Total amount of component constituting receiving layer and cationic resin (mg/inch$^2$) | | | | | | | | | | | | |
| Ratio A | | — | | | | — | | | | 17253 | | |
| Ratio B | | — | | | | — | | | | — | | |
| Ratio C | | — | | | | — | | | | — | | |
| Unevenness in solid of first ink on recording medium | | C | | | | A | | | | B | | |
| Bleeding at the time of recording first ink and second ink in superimposed manner | | C | | | | B | | | | C | | |
| Precipitation of first reaction liquid on recording medium | | A | | | | A | | | | A | | |
| Cloudiness of image portion | | A | | | | A | | | | A | | |
| Bad odor of recorded matter | | A | | | | A | | | | A | | |
| Stickiness of recorded matter | | A | | | | A | | | | A | | |
| Recording speed | | B | | | | B | | | | C | | |
| Clogging reliability | | B | | | | C | | | | A | | |

Comparing Examples and Comparative Examples, according to the recording method of the present invention, it was found that when a plurality of inks is recorded on a non-absorptive recording medium or a low-absorptive recording medium in a superimposed manner, it is possible to prevent the occurrence of bleeding among these inks, to suppress the cohesion unevenness of ink, and to suppress the occurrence of clogging in an ink jet nozzle.

Further, comparing Examples and Comparative Examples 1 to 4, it was found that when the first reaction liquid and the second reaction liquid do not contain a coagulant, the bleeding at the time of recording the first ink and the second ink in a superimposed manner and the cohesion unevenness of the first ink occur.

Further, comparing Examples and Comparative Example 2, it was found that when the first reaction liquid does not contain a coagulant, the cohesion unevenness of the first ink occurs.

Further, comparing Examples and Comparative Example 3, it was found that when the second reaction liquid does not contain a coagulant, bleeding occurs at the time of recording the first ink and the second ink in a superimposed manner.

Further, comparing Examples and Comparative Example 5, it was found that when dryness factor is increased by heating, it is possible to suppress the cohesion unevenness of the first ink while maintaining recording speed. However, it was found that when the first reaction liquid and the second reaction liquid do not contain a coagulant, clogging reliability deteriorates.

Further, comparing Examples and Comparative Example 6, it was found that when the second reaction liquid is not used, bleeding occurs at the time of recording the first ink and the second ink in a superimposed manner.

Comparing Example 19 and other Examples, it was found that when coated paper is used as a recording medium, a small amount of ink is absorbed in the coated paper, and thus the bleeding occurring at the time of recording the first ink and the second ink in a superimposed manner is suppressed.

Comparing Example 20 and other Examples, it was found that when the surface tension of the first reaction liquid is less than 65 mN/m, the cohesion unevenness of the first ink is suppressed, and the precipitation of the first reaction liquid is suppressed.

The entire disclosure of Japanese Patent Application No. 2014-002996, filed Jan. 10, 2014 and 2014-109851, filed May 28, 2014 are expressly incorporated by reference herein.

What is claimed is:

1. A recording method, comprising:
   sequentially attaching a first reaction liquid, a first ink containing a color material, a second reaction liquid, and a second ink containing a color material to a non-absorptive recording medium or a low-absorptive recording medium in a superimposed manner,
   wherein the first reaction liquid contains a coagulant for coagulating or thickening a component of the first ink, and
   wherein the second reaction liquid contains a coagulant for coagulating or thickening a component of the second ink.

2. The recording method according to claim 1,
wherein any one of the first ink and the second ink is a color ink containing a color material or a black ink containing a black color material, and
wherein the other one of the first ink and the second ink is a white ink containing a white color material or a metallic ink containing a metallic color material.

3. The recording method according to claim 1,
wherein the first reaction liquid contains at least one coagulant selected from the group consisting of a polyvalent metal salt and an organic acid.

4. The recording method according to claim 1,
wherein the second reaction liquid contains at least one coagulant selected from the group consisting of a polyvalent metal salt and an organic acid.

5. The recording method according to claim 1,
wherein the second reaction liquid further contains at least one of a component constituting a receiving layer of the second ink, and a cationic resin.

6. The recording method according to claim 5,
wherein the ratio of the attachment amount (unit: g) of the color material contained in the second ink per unit area of the attachment region on the recording medium to the attachment amount (unit: g) of at least one of the component constituting the receiving layer of the second ink, and the cationic resin, which are contained in the second reaction liquid, per unit area of an attachment region on the recording medium is 3 to 30.

7. The recording method according to claim 1,
wherein the first ink is a white ink containing a white color material or a metallic ink containing a metallic color material.

8. The recording method according to claim 1,
wherein the ratio of the attachment amount (unit: g) of the color material contained in the first ink per unit area of the attachment region on the recording medium to the attachment amount (unit: mol) of the coagulant contained in the first reaction liquid per unit area of an attachment region on the recording medium is 900 to 35000.

9. The recording method according to claim 1,
wherein the recording medium is a non-absorptive recording medium.

10. The recording method according to claim 1,
wherein the first reaction liquid contains a surfactant, and has a surface tension of less than or equal to 50 mN/m.

11. The recording method according to claim 1,
wherein the ratio of the attachment amount (unit: mol) of the coagulant contained in the second reaction liquid per unit area of an attachment region on the recording medium to the attachment amount (unit: g) of the color material contained in the second ink per unit area of the attachment region on the recording medium is 900 to 35000.

* * * * *